US010447603B2

(12) United States Patent
Ni

(10) Patent No.: US 10,447,603 B2
(45) Date of Patent: Oct. 15, 2019

(54) CONTROL SIGNALING TRANSMISSION METHOD AND DEVICE

(71) Applicant: HUAWEI TECHNOLOGIES CO., LTD., Shenzhen, Guangdong (CN)

(72) Inventor: Hui Ni, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 114 days.

(21) Appl. No.: 15/606,274

(22) Filed: May 26, 2017

(65) Prior Publication Data

US 2017/0264553 A1    Sep. 14, 2017

Related U.S. Application Data

(63) Continuation of application No. PCT/CN2014/092472, filed on Nov. 28, 2014.

(51) Int. Cl.
*H04L 12/28* (2006.01)
*H04L 12/801* (2013.01)
(Continued)

(52) U.S. Cl.
CPC ............ *H04L 47/17* (2013.01); *H04L 12/64* (2013.01); *H04L 45/124* (2013.01); *H04W 28/0289* (2013.01)

(58) Field of Classification Search
CPC ....... H04L 47/17; H04L 12/64; H04L 45/124; H04W 28/0289
(Continued)

(56) References Cited

U.S. PATENT DOCUMENTS 7,703,611 B1    4/2010  Appelman et al.
2004/0223491 A1  11/2004  Levy-Abegnoli et al.
(Continued)

FOREIGN PATENT DOCUMENTS

CN      1839586 A    9/2006
CN    102025593 A    4/2011
(Continued)

OTHER PUBLICATIONS

International Search Report dated Aug. 5, 2015 in corresponding International Application No. PCT/CN2014/092472.
(Continued)

*Primary Examiner* — Chuong T Ho

(57) ABSTRACT

A control signaling transmission method and a device are disclosed. The method includes: receiving, by a forwarder, control signaling carrying rule matching information, where the rule matching information includes classification information and an identifier of a mobile context of user equipment; obtaining, by the forwarder according to the rule matching information, a processing rule corresponding to the rule matching information, where the processing rule includes rule description information and forwarding routing information, and the processing rule corresponding to the rule matching information is a processing rule whose rule description information matches the rule matching information; and forwarding, by the forwarder, the control signaling to a next-hop network element for the control signaling according to the forwarding routing information of the obtained processing rule.

18 Claims, 15 Drawing Sheets

(51) Int. Cl.
*H04L 12/64* (2006.01)
*H04L 12/721* (2013.01)
*H04W 28/02* (2009.01)

(58) Field of Classification Search
USPC .................................................. 370/236, 392
See application file for complete search history.

(56) References Cited

U.S. PATENT DOCUMENTS

| | | | |
|---|---|---|---|
| 2010/0246500 A1 | 9/2010 | Rydnell et al. | |
| 2010/0322128 A1* | 12/2010 | Becker .................... | H04W 4/08 370/312 |
| 2011/0158181 A1* | 6/2011 | Walker .................. | H04W 12/06 370/329 |
| 2012/0064878 A1* | 3/2012 | Castro Castro ......... | H04L 12/14 455/418 |
| 2012/0140701 A1* | 6/2012 | Huang ............... | H04B 7/15528 370/315 |
| 2015/0026780 A1* | 1/2015 | Igarashi ................. | H04L 63/10 726/5 |
| 2015/0131666 A1* | 5/2015 | Kang .................... | H04L 45/745 370/392 |
| 2015/0236912 A1 | 8/2015 | Zhang | |
| 2015/0381557 A1 | 12/2015 | Fan et al. | |

FOREIGN PATENT DOCUMENTS

| | | |
|---|---|---|
| CN | 103813336 A | 5/2014 |
| CN | 104052661 A | 9/2014 |
| EP | 2439991 A1 | 4/2012 |
| EP | 2757828 A1 | 7/2014 |
| WO | 2012/023415 A1 | 2/2012 |

OTHER PUBLICATIONS

International Search Report dated Aug. 5, 2015 in corresponding International Application PCT/CN2014/092472.
Extended European Search Report dated Oct. 20, 2017 in corresponding European Patent Application No. 14906674.8.
Communication pursuant to Article 94(3) EPC, dated Jul. 4, 2019, in European Application No. 14906674.8 (4 pp.).

* cited by examiner

CONT.
FROM
FIG. 6B-1

When the user needs to initiate a new service connection, the MME sends service management request signaling to an OF switch connected to the MME — 607

The OF switch obtains a flow entry corresponding to first rule matching information, and forwards, according to the flow entry, the service management request signaling to a next-hop network element for the service management request signaling — 608

The target eNB performs a control operation indicated by the service management request signaling; generates session management response signaling; and sends the session management response signaling to an OF switch connected to the target eNB — 609

The OF switch obtains a flow entry corresponding to second rule matching information, and forwards, according to the flow entry, the session management response signaling to a next-hop network element for the session management response signaling — 610

The MME receives a session management response message — 611

FIG. 6B-2

CONTROL SIGNALING TRANSMISSION METHOD AND DEVICE

CROSS-REFERENCE TO RELATED APPLICATIONS

This application is a continuation of International Application No. PCT/CN2014/092472, filed on Nov. 28, 2014, the disclosure of which is hereby incorporated by reference in its entirety.

TECHNICAL FIELD

The present invention relates to the communications field, and in particular, to a control signaling transmission method and a device.

BACKGROUND

In a mobile network, according to a function for which a network element is responsible, the network element maintains a mobile context of user equipment. The mobile context includes information required for serving the user equipment, and the information includes static information, dynamic information, and the like. For example, in a mobility management entity (MME), the mobile context includes: an international mobile subscriber identity (IMSI), an equipment identity (ME Identity), a mobility management context (MM Context), a bearer context (EPS bearer Context), a serving gateway (S-GW) interface identifier and a tunnel endpoint identifier (TED), a capability of supporting features such as idle mode signaling reduction (ISR) and a closed subscriber group (CSG), a time zone in which a terminal is located, and the like. The mobility management context may include a security parameter used for security authentication, such as a security key or an authentication vector, a user equipment bandwidth, or access restriction information. The bearer context may include access point name (APN) information, a user equipment Internet Protocol (IP, Internet Protocol) address, charging information, a bearer identifier, a traffic flow template (TFT), bearer-level quality of service (QoS), and the like.

Multiple network elements of each type may be deployed in the mobile network, and are used for distributed processing or load balancing. When a network element in the mobile network needs to perform a specific service for user equipment, the network element needs to learn in advance of an IP address of a network element serving the user equipment, that is, a network element saving a mobile context of the user equipment, and send, by using a control protocol such as GPRS Tunneling Protocol (GTP), control signaling in which the IP address of the network element is used as a destination IP address, so as to interact with the network element serving the user equipment. To implement operations required in the foregoing procedure, each time a network element is switched, the network element needs to send an address update notification to a related surrounding network element, so that the surrounding network element can update, in a timely manner, addressing information that is of a mobile context of related user equipment and that is saved in the surrounding network element.

In a conventional telecommunication network, a mobile context of user equipment is usually anchored on a specific network element, and addressing information that is of the context of the user equipment and that is saved in a surrounding network element needs to be updated only when switching, maintenance, or load balancing is performed. Therefore, a signaling quality caused during the foregoing configuration and switching procedure is acceptable. However, in a current trend, a function of a network element is virtualized, and the network element is deployed in a data center in a virtual network function (VNF) form. A deployment scenario of a mobile network element in a cloud network challenges the mode in which the mobile context of the user equipment is bound with a specific network element.

Dynamic adjustment requirements of the cloud network such as management, load balance, and power saving may make it common to switch a network element serving user equipment. However, a large amount of signaling exchange across data centers is required for migrating the mobile context of the user equipment between network elements, so that excessive transmission resources of the cloud network are occupied.

SUMMARY

Embodiments of the present invention provide a control signaling transmission method and a device, so that control signaling can be transmitted based on addressing of a mobile context of user equipment in a cloud network, signaling exchange across data centers caused when the mobile context of the user equipment is migrated between network elements can be avoided, and transmission resources of the cloud network are reduced.

According to a first aspect, a control signaling transmission method is provided, including:

receiving, by a forwarder, control signaling carrying rule matching information, where the rule matching information includes classification information and an identifier of a mobile context of user equipment;

obtaining, by the forwarder according to the rule matching information, a processing rule corresponding to the rule matching information, where the processing rule includes rule description information and forwarding routing information, the processing rule corresponding to the rule matching information is a processing rule whose rule description information matches the rule matching information, and the match between the rule description information and the rule matching information includes: a match between classification information in the rule description information and the classification information in the rule matching information, and a match between an identifier of a mobile context of user equipment in the rule description information and the identifier of the mobile context of the user equipment in the rule matching information; and forwarding, by the forwarder, the control signaling to a next-hop network element according to the forwarding routing information of the obtained processing rule.

With reference to the first aspect, in a first possible implementation manner of the first aspect, before the receiving, by a forwarder, control signaling carrying rule matching information, the method further includes:

receiving and saving, by the forwarder, a processing rule that is sent by a controller and that is related to the mobile context of the user equipment, where the processing rule related to the mobile context of the user equipment is determined by the controller according to a route between the forwarder and a service network element, or a route between the forwarder and a target network element, the service network element is a network element serving the user equipment, and the target network element is a network element to which the mobile context of the user equipment belongs.

With reference to the first aspect, in a second possible implementation manner of the first aspect, the method further includes:

when the mobile context of the user equipment is migrated from an original target network element to a new target network element, receiving, by the forwarder, a processing rule that is sent by a controller and that is related to the mobile context of the user equipment; and updating, according to the received processing rule, a processing rule that is locally saved by the forwarder and that is related to the mobile context of the user equipment; where the processing rule received by the forwarder is determined by the controller according to a route between the forwarder and the new target network element, and the new target network element is a network element to which the mobile context of the user equipment belongs after the mobile context of the user equipment is migrated.

With reference to the first possible implementation manner of the first aspect, and/or the second possible implementation manner of the first aspect, in a third possible implementation manner of the first aspect, the obtaining, by the forwarder according to the rule matching information, a processing rule corresponding to the rule matching information includes:

finding, by the forwarder from processing rules saved by the forwarder and according to the rule matching information, the processing rule corresponding to the rule matching information.

With reference to the third possible implementation manner of the first aspect, in a fourth possible implementation manner of the first aspect, the finding, by the forwarder from processing rules saved by the forwarder and according to the rule matching information, the processing rule corresponding to the rule matching information includes:

searching, by the forwarder according to the rule matching information, rule description information in the processing rules saved by the forwarder; finding rule description information matching the rule matching information; and using a processing rule including the found rule description information as the processing rule corresponding to the rule matching information.

With reference to the first aspect, in a fifth possible implementation manner of the first aspect, the obtaining, by the forwarder according to the rule matching information, a processing rule corresponding to the rule matching information includes:

sending, by the forwarder, a processing rule query request to a controller, where the request carries the rule matching information, and the processing rule query request is used to request the processing rule corresponding to the rule matching information; and receiving, by the forwarder, the processing rule that is sent by the controller and that corresponds to the rule matching information.

With reference to the first aspect, and/or the first possible implementation manner of the first aspect, and/or the second possible implementation manner of the first aspect, and/or the third possible implementation manner of the first aspect, and/or the fourth possible implementation manner of the first aspect, and/or the fifth possible implementation manner of the first aspect, in a sixth possible implementation manner of the first aspect, the forwarding routing information of the processing rule includes a forwarding port; and the forwarding, by the forwarder, the control signaling to a next-hop network element according to the forwarding routing information of the obtained processing rule includes:

forwarding, by the forwarder, the control signaling to the next-hop network element by using the forwarding port.

With reference to the first aspect, and/or the first possible implementation manner of the first aspect, and/or the second possible implementation manner of the first aspect, and/or the third possible implementation manner of the first aspect, and/or the fourth possible implementation manner of the first aspect, and/or the fifth possible implementation manner of the first aspect, and/or the sixth possible implementation manner of the first aspect, in a seventh possible implementation manner of the first aspect, the identifier of the mobile context of the user equipment includes: an international mobile subscriber identity IMSI or a packet temporary mobile subscriber identity P-TMSI of the user equipment.

With reference to the first aspect, and/or the first possible implementation manner of the first aspect, and/or the second possible implementation manner of the first aspect, and/or the third possible implementation manner of the first aspect, and/or the fourth possible implementation manner of the first aspect, and/or the fifth possible implementation manner of the first aspect, and/or the sixth possible implementation manner of the first aspect, and/or the seventh possible implementation manner of the first aspect, in an eighth possible implementation manner of the first aspect, the classification information includes a network element type of a destination network element for the control signaling, or a signaling type of the control signaling.

With reference to the eighth possible implementation manner of the first aspect, in a ninth possible implementation manner of the first aspect, the network element type of the destination network element for the control signaling includes: a mobility management entity MME or an evolved NodeB eNB; or the network element type of the destination network element for the control signaling includes: a target network element or a service network element; or the signaling type of the control signaling includes: a service request or a service response.

According to a second aspect, a control signaling transmission method is provided, including:

determining, by a controller, a route between a forwarder and a service network element and a route between the forwarder and a target network element, where the service network element is a network element accessed by user equipment, and the target network element is a network element to which a mobile context of the user equipment belongs;

determining, by the controller according to the route between the forwarder and the service network element and the route between the forwarder and the target network element, a processing rule that corresponds to the forwarder and that is related to the mobile context of the user equipment, where the processing rule is used when the forwarder forwards, according to the processing rule, control signaling carrying rule matching information to a next-hop network element, the processing rule includes rule description information and forwarding routing information, the rule description information matches the rule matching information, the rule matching information includes classification information and an identifier of the mobile context of the user equipment, and the match between the rule description information and the rule matching information includes: a match between classification information in the rule description information and the classification information in the rule matching information, and a match between an identifier of a mobile context of user equipment in the rule description information and the identifier of the mobile context of the user equipment in the rule matching information; and sending, by the controller, the processing rule that corresponds to the forwarder and that is related to the mobile context of the user equipment to the forwarder.

With reference to the second aspect, in a first possible implementation manner of the second aspect, the method further includes:

receiving, by the controller, a processing rule query request sent by the forwarder, where the request carries the rule matching information, and the processing rule query request is used to request a processing rule corresponding to the rule matching information;

obtaining, by the controller, the processing rule corresponding to the rule matching information; and sending, by the controller, the obtained processing rule corresponding to the rule matching information to the forwarder.

With reference to the first possible implementation manner of the second aspect, in a second possible implementation manner of the second aspect, the obtaining, by the controller, the processing rule corresponding to the rule matching information includes:

searching, by the controller according to the rule matching information, rule description information in processing rules saved by the controller; finding rule description information matching the rule matching information; and using a processing rule including the found rule description information as the processing rule corresponding to the rule matching information.

With reference to the second aspect, and/or the first possible implementation manner of the second aspect, and/or the second possible implementation manner of the second aspect, in a third possible implementation manner of the second aspect, the method further includes:

receiving, by the controller, a first path switch request message sent by the target network element, where the first path switch request message includes an identifier of the user equipment and an identifier of the target network element, and the first path switch request message is used to request the controller to determine the processing rule that corresponds to the forwarder and that is related to the mobile context of the user equipment.

With reference to the second aspect, and/or the first possible implementation manner of the second aspect, and/or the second possible implementation manner of the second aspect, and/or the third possible implementation manner of the second aspect, in a fourth possible implementation manner of the second aspect, the method further includes:

when the mobile context of the user equipment is migrated from an original target network element to a new target network element, receiving, by the controller, a second path switch request message sent by the new target network element, where the second path switch request message includes the identifier of the user equipment and an identifier of the new target network element; and the second path switch request message is used to request the controller to determine the processing rule that corresponds to the forwarder and that is related to the mobile context of the user equipment;

determining, by the controller, a route between the forwarder and the new target network element indicated by the identifier of the new target network element; and determining, by the controller according to the determined route between the forwarder and the new target network element, a processing rule that corresponds to each forwarder and that is related to the mobile context of the user equipment.

With reference to the second aspect, and/or the first possible implementation manner of the second aspect, and/or the second possible implementation manner of the second aspect, in a fifth possible implementation manner of the second aspect, the method further includes:

determining, by the controller, the target network element; and sending, by the controller, first service control signaling to the target network element, where the first service control signaling carries an identifier of the user equipment, and the first service control signaling is used to instruct the target network element to create the mobile context for the user equipment.

With reference to the second aspect, and/or the first possible implementation manner of the second aspect, and/or the second possible implementation manner of the second aspect, and/or the fifth possible implementation manner of the second aspect, in a sixth possible implementation manner of the second aspect, the method further includes:

when the mobile context of the user equipment is migrated from an original target network element to a new target network element, determining, by the controller, the new target network element; and sending, by the controller, second service control signaling to the new target network element, where the second service control signaling carries the identifier of the user equipment and an identifier of the original target network element, and the second service control signaling is used to instruct the new target network element to obtain the mobile context of the user equipment from the original target network element.

With reference to the second aspect, and/or the first possible implementation manner of the second aspect, and/or the second possible implementation manner of the second aspect, and/or the third possible implementation manner of the second aspect, and/or the fourth possible implementation manner of the second aspect, and/or the fifth possible implementation manner of the second aspect, and/or the sixth possible implementation manner of the second aspect, in a seventh possible implementation manner of the second aspect, the identifier of the mobile context of the user equipment includes: an international mobile subscriber identity IMSI or a packet temporary mobile subscriber identity P-TMSI of the user equipment.

With reference to the second aspect, and/or the first possible implementation manner of the second aspect, and/or the second possible implementation manner of the second aspect, and/or the third possible implementation manner of the second aspect, and/or the fourth possible implementation manner of the second aspect, and/or the fifth possible implementation manner of the second aspect, and/or the sixth possible implementation manner of the second aspect, and/or the seventh possible implementation manner of the second aspect, in an eighth possible implementation manner of the second aspect, the classification information includes a network element type of a destination network element for the control signaling, or a signaling type of the control signaling.

With reference to the eighth possible implementation manner of the second aspect, in a ninth possible implementation manner of the second aspect, the network element type of the destination network element for the control signaling includes: a mobility management entity MME or an evolved NodeB eNB; or the network element type of the destination network element for the control signaling includes: a target network element or a service network element; or the signaling type of the control signaling includes: a service request or a service response.

According to a third aspect, a forwarder is provided, including:

a receiving unit, configured to receive control signaling carrying rule matching information, where the rule matching information includes classification information and an identifier of a mobile context of user equipment;

an obtaining unit, configured to obtain, according to the rule matching information received by the receiving unit, a processing rule corresponding to the rule matching information, where the processing rule includes rule description information and forwarding routing information, the processing rule corresponding to the rule matching information is a processing rule whose rule description information matches the rule matching information, and the match between the rule description information and the rule matching information includes: a match between classification information in the rule description information and the classification information in the rule matching information, and a match between an identifier of a mobile context of user equipment in the rule description information and the identifier of the mobile context of the user equipment in the rule matching information; and a forwarding unit, configured to forward, according to the forwarding routing information of the processing rule obtained by the obtaining unit, the control signaling received by the receiving unit to a next-hop network element for the control signaling.

With reference to the third aspect, in a first possible implementation manner of the third aspect, the receiving unit is further configured to: receive a processing rule that is sent by a controller and that is related to the mobile context of the user equipment, where the processing rule related to the mobile context of the user equipment is determined by the controller according to a route between the forwarder and a service network element, or a route between the forwarder and a target network element, the service network element is a network element serving the user equipment, and the target network element is a network element to which the mobile context of the user equipment belongs; and the forwarder further includes:

a storage unit, configured to save the processing rule received by the receiving unit.

With reference to the first possible implementation manner of the third aspect, in a second possible implementation manner of the third aspect, the receiving unit is further configured to: when the mobile context of the user equipment is migrated from an original target network element to a new target network element, receive the processing rule that is sent by the controller and that is related to the mobile context of the user equipment; and the storage unit is further configured to update, according to the processing rule received by the receiving unit, the processing rule that is saved by the storage unit and that is related to the mobile context of the user equipment; where the processing rule received by the receiving unit is determined by the controller according to a route between the forwarder and the new target network element, and the new target network element is a network element to which the mobile context of the user equipment belongs after the mobile context of the user equipment is migrated.

With reference to the first possible implementation manner of the third aspect, and/or the second possible implementation manner of the third aspect, in a third possible implementation manner of the third aspect, the obtaining unit is configured to find, from processing rules saved by the storage unit and according to the rule matching information, the processing rule corresponding to the rule matching information.

With reference to the third possible implementation manner of the third aspect, in a fourth possible implementation manner of the third aspect, the obtaining unit is configured to: search, according to the rule matching information, rule description information in the processing rules saved by the storage unit; find rule description information matching the rule matching information; and use a processing rule including the found rule description information as the processing rule corresponding to the rule matching information.

With reference to the third aspect, in a fifth possible implementation manner of the third aspect, the obtaining unit is configured to: send a processing rule query request to a controller, where the request carries the rule matching information; and receive the processing rule that is sent by the controller and that corresponds to the rule matching information.

With reference to the third aspect, and/or the first possible implementation manner of the third aspect, and/or the second possible implementation manner of the third aspect, and/or the third possible implementation manner of the third aspect, and/or the fourth possible implementation manner of the third aspect, and/or the fifth possible implementation manner of the third aspect, in a sixth possible implementation manner of the third aspect, the forwarding routing information of the processing rule includes a forwarding port; and the forwarding unit is configured to forward, by using the forwarding port, the control signaling received by the receiving unit, so as to forward the control signaling to the next-hop network element.

With reference to the third aspect, and/or the first possible implementation manner of the third aspect, and/or the second possible implementation manner of the third aspect, and/or the third possible implementation manner of the third aspect, and/or the fourth possible implementation manner of the third aspect, and/or the fifth possible implementation manner of the third aspect, and/or the sixth possible implementation manner of the third aspect, in a seventh possible implementation manner of the third aspect, the identifier of the mobile context of the user equipment includes: an international mobile subscriber identity IMSI or a packet temporary mobile subscriber identity P-TMSI of the user equipment.

With reference to the third aspect, and/or the first possible implementation manner of the third aspect, and/or the second possible implementation manner of the third aspect, and/or the third possible implementation manner of the third aspect, and/or the fourth possible implementation manner of the third aspect, and/or the fifth possible implementation manner of the third aspect, and/or the sixth possible implementation manner of the third aspect, and/or the seventh possible implementation manner of the third aspect, in an eighth possible implementation manner of the third aspect, the classification information includes a network element type of a destination network element for the control signaling, or a signaling type of the control signaling.

With reference to the eighth possible implementation manner of the third aspect, in a ninth possible implementation manner of the third aspect, the network element type of the destination network element for the control signaling includes: a mobility management entity MME or an evolved NodeB eNB; or the network element type of the destination network element for the control signaling includes: a target network element or a service network element; or the signaling type of the control signaling includes: a service request or a service response.

According to a fourth aspect, a controller is provided, including:

a determining unit, configured to: determine a route between a forwarder and a service network element and a route between the forwarder and a target network element, where the service network element is a network element accessed by user equipment, and the target network element is a network element to which a mobile context of the user equipment belongs; and determine, according to the route between the forwarder and the service network element and the route between the forwarder and the target network element, a processing rule that corresponds to the forwarder and that is related to the mobile context of the user equipment, where the processing rule is used when the forwarder forwards, according to the processing rule, control signaling carrying rule matching information to a next-hop network element, the processing rule includes rule description information and forwarding routing information, the rule description information matches the rule matching information, the rule matching information includes classification information and an identifier of the mobile context of the user equipment, and the match between the rule description information and the rule matching information includes: a match between classification information in the rule description information and the classification information in the rule matching information, and a match between an identifier of a mobile context of user equipment in the rule description information and the identifier of the mobile context of the user equipment in the rule matching information; and a sending unit, configured to send, to the forwarder, the processing rule that is determined by the determining unit, that corresponds to the forwarder, and that is related to the mobile context of the user equipment.

With reference to the fourth aspect, in a first possible implementation manner of the fourth aspect, the controller further includes:

a first receiving unit, configured to receive a processing rule query request sent by the forwarder, where the request carries the rule matching information; and an obtaining unit, configured to obtain a processing rule corresponding to the rule matching information received by the first receiving unit; where the sending unit is further configured to send the processing rule that is obtained by the obtaining unit and that corresponds to the rule matching information to the forwarder.

With reference to the first possible implementation manner of the fourth aspect, in a second possible implementation manner of the fourth aspect, the obtaining unit is configured to: search, according to the rule matching information carried in the request received by the first receiving unit, rule description information in processing rules saved by the controller; find rule description information matching the rule matching information; and use a processing rule including the found rule description information as the processing rule corresponding to the rule matching information.

With reference to the fourth aspect, and/or the first possible implementation manner of the fourth aspect, and/or the second possible implementation manner of the fourth aspect, in a third possible implementation manner of the fourth aspect, the controller further includes:

a second receiving unit, configured to receive a first path switch request message sent by the target network element, where the first path switch request message includes an identifier of the user equipment and an identifier of the target network element, and the first path switch request message is used to request the controller to determine the processing rule that corresponds to the forwarder and that is related to the mobile context of the user equipment.

With reference to the third possible implementation manner of the fourth aspect, in a fourth possible implementation manner of the fourth aspect, the second receiving unit is further configured to: when the mobile context of the user equipment is migrated from an original target network element to a new target network element, receive a second path switch request message sent by the new target network element, where the second path switch request message includes the identifier of the user equipment and an identifier of the new target network element, and the second path switch request message is used to request the controller to determine the processing rule that corresponds to the forwarder and that is related to the mobile context of the user equipment; and the determining unit is further configured to: determine a route between the forwarder and the new target network element indicated by the identifier that is of the new target network element and that is received by the second receiving unit; and determine, according to the determined route between the forwarder and the new target network element, a processing rule that corresponds to each forwarder and that is related to the mobile context of the user equipment.

With reference to the fourth aspect, and/or the first possible implementation manner of the fourth aspect, and/or the second possible implementation manner of the fourth aspect, in a fifth possible implementation manner of the fourth aspect, the determining unit is further configured to determine the target network element; and the sending unit is further configured to send first service control signaling to the target network element determined by the determining unit, where the first service control signaling carries an identifier of the user equipment, and the first service control signaling is used to instruct the target network element to create the mobile context for the user equipment.

With reference to the fourth aspect, and/or the first possible implementation manner of the fourth aspect, and/or the second possible implementation manner of the fourth aspect, and/or the fifth possible implementation manner of the fourth aspect, in a sixth possible implementation manner of the fourth aspect, the determining unit is further configured to: when the mobile context of the user equipment is migrated from an original target network element to a new target network element, determine the new target network element; and the sending unit is further configured to send second service control signaling to the new target network element, where the second service control signaling carries the identifier of the user equipment and an identifier of the original target network element, and the second service control signaling is used to instruct the new target network element to obtain the mobile context of the user equipment from the original target network element.

With reference to the fourth aspect, and/or the first possible implementation manner of the fourth aspect, and/or the second possible implementation manner of the fourth aspect, and/or the third possible implementation manner of the fourth aspect, and/or the fourth possible implementation manner of the fourth aspect, and/or the fifth possible implementation manner of the fourth aspect, and/or the sixth possible implementation manner of the fourth aspect, in a seventh possible implementation manner of the fourth aspect, the identifier of the mobile context of the user equipment includes: an international mobile subscriber identity IMSI or a packet temporary mobile subscriber identity P-TMSI of the user equipment.

With reference to the fourth aspect, and/or the first possible implementation manner of the fourth aspect, and/or the second possible implementation manner of the fourth aspect, and/or the third possible implementation manner of the fourth aspect, and/or the fourth possible implementation manner of the fourth aspect, and/or the fifth possible implementation manner of the fourth aspect, and/or the sixth possible implementation manner of the fourth aspect, and/or the seventh possible implementation manner of the fourth aspect, in an eighth possible implementation manner of the fourth aspect, the classification information includes a network element type of a destination network element for the control signaling, or a signaling type of the control signaling.

With reference to the eighth possible implementation manner of the fourth aspect, in a ninth possible implementation manner of the fourth aspect, the network element type of the destination network element for the control signaling includes: a mobility management entity MME or an evolved NodeB eNB; or the network element type of the destination network element for the control signaling includes: a target network element or a service network element; or the signaling type of the control signaling includes: a service request or a service response.

According to a fifth aspect, a forwarder is provided, including:

a receiver, configured to receive control signaling carrying rule matching information, where the rule matching information includes classification information and an identifier of a mobile context of user equipment;

a processor, configured to obtain, according to the rule matching information received by the receiver, a processing rule corresponding to the rule matching information, where the processing rule includes rule description information and forwarding routing information, the processing rule corresponding to the rule matching information is a processing rule whose rule description information matches the rule matching information, and the match between the rule description information and the rule matching information includes: a match between classification information in the rule description information and the classification information in the rule matching information, and a match between an identifier of a mobile context of user equipment in the rule description information and the identifier of the mobile context of the user equipment in the rule matching information; and a transmitter, configured to forward, according to the forwarding routing information of the processing rule obtained by the processor, the control signaling received by the receiver to a next-hop network element.

According to a sixth aspect, a controller is provided, including:

a processor, configured to: determine a route between a forwarder and a service network element and a route between the forwarder and a target network element, where the service network element is a network element accessed by user equipment, and the target network element is a network element to which a mobile context of the user equipment belongs; and determine, according to the route between the forwarder and the service network element and the route between the forwarder and the target network element, a processing rule that corresponds to the forwarder and that is related to the mobile context of the user equipment, where the processing rule is used when the forwarder forwards, according to the processing rule, control signaling carrying rule matching information to a next-hop network element, the processing rule includes rule description information and forwarding routing information, the rule description information matches the rule matching information, the rule matching information includes classification information and an identifier of the mobile context of the user equipment, and the match between the rule description information and the rule matching information includes: a match between classification information in the rule description information and the classification information in the rule matching information, and a match between an identifier of a mobile context of user equipment in the rule description information and the identifier of the mobile context of the user equipment in the rule matching information; and a transmitter, configured to send, to the forwarder, the processing rule that is determined by the processor, that corresponds to the forwarder, and that is related to the mobile context of the user equipment.

In the embodiments of the present invention, a forwarder receives control signaling carrying rule matching information, where the rule matching information includes classification information and an identifier of a mobile context of user equipment; obtains, according to the rule matching information, a processing rule corresponding to the rule matching information, where the processing rule includes rule description information and forwarding routing information, the processing rule corresponding to the rule matching information is a processing rule whose rule description information matches the rule matching information, and the match between the rule description information and the rule matching information includes: a match between classification information in the rule description information and the classification information in the rule matching information, and a match between an identifier of a mobile context of user equipment in the rule description information and the identifier of the mobile context of the user equipment in the rule matching information; and forwards the control signaling to a next-hop network element for the control signaling according to the forwarding routing information of the obtained processing rule. Therefore, in an addressing process of a mobile context of user equipment, control signaling exchanged between a service network element and a target network element is not transmitted in an IP address manner, and a forwarder obtains, according to rule matching information in the control signaling, a processing rule corresponding to the rule matching information, and forwards the control signaling to a next-hop network element for the control signaling according to forwarding routing information of the obtained processing rule, so that the control signaling is exchanged between the service network element and the target network element by means of hop-by-hop forwarding by the forwarder. In addition, when the mobile context of the user equipment is migrated from an original target network element to a new target network element, only a related processing rule needs to be updated, without the need of signaling exchange across data centers, so that transmission resources of a cloud network are reduced.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

FIG. 4B-1 and FIG. 4B-2 are a schematic diagram of a third embodiment of a control signaling transmission method according to the present invention;

FIG. 5B-1 and FIG. 5B-2 are a schematic diagram of a fourth embodiment of a control signaling transmission method according to the present invention;

FIG. 6B-1 and FIG. 6B-2 are a schematic diagram of a fifth embodiment of a control signaling transmission method according to the present invention;

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
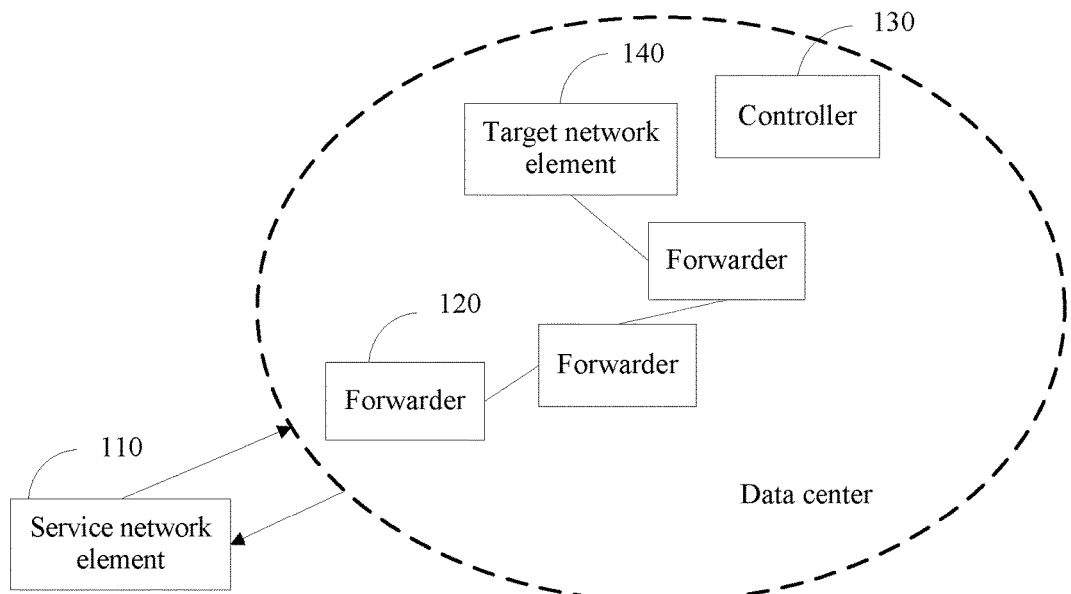
FIG. 1 is a structural diagram of an application scenario of a control signaling transmission method according to an embodiment of the present invention.

Referring to FIG. 1, FIG. 1 is an example of an application scenario of a control signaling transmission method and a device according to an embodiment of the present invention. A service network element 110, a forwarder 120, a controller 130, and a target network element 140 are included herein.

The service network element 110 is a network element serving user equipment. The target network element 140 is a network element to which a mobile context of the user equipment belongs. The forwarder 120 is configured to forward control signaling between the service network element 110 and the target network element 140 according to a processing rule. The controller 130 (a connection relationship between the controller 130, the forwarder 120, and the target network element 140 is not shown) is configured to control the processing rule by which the forwarder 120 forwards the control signaling.

The processing rule includes two parts: rule description information and forwarding routing information.

The rule description information is used to identify the processing rule. The rule description information may include a mobile context identifier and classification information. The mobile context identifier is used to identify a mobile context of user equipment, and may be implemented by using an identifier of the user equipment such as an IMSI or a packet temporary mobile subscriber identity (P-TMSI). The classification information is used to indicate a class of the control signaling. For example, different possible values may be set according to a destination network element for the control signaling or a signaling type of the control signaling. For example, the classification information may include a network element type of the destination network element for the control signaling, such as a network element type like an MME or an eNB, or a network element type like a target network element or a service network element. Alternatively, the classification information may include a signaling type such as a service request or a service response.

The forwarding routing information is used to indicate a forwarding route of control signaling corresponding to a processing rule, so that a forwarder forwards the control signaling corresponding to the processing rule to a next-hop network element. In a possible implementation manner, the forwarding routing information may be implemented by using a forwarding port identifier for the control signaling in the forwarder.

The control signaling in this embodiment of the present invention includes rule matching information. The rule matching information is used to identify the control signaling. A parameter included in the rule matching information is generally the same as a parameter included in the rule description information. For example, the rule description information includes the mobile context identifier and the classification information, and the rule matching information also includes a mobile context identifier and classification information. Therefore, the rule matching information can match the rule description information of the processing rule, and a correspondence between the control signaling and the processing rule is obtained. The match between the rule description information and the rule matching information may include: a match between the classification information in the rule description information and the classification information in the rule matching information, and a match between the identifier of the mobile context of the user equipment in the rule description information and the identifier of the mobile context of the user equipment in the rule matching information.

When rule matching information carried in control signaling matches rule description information in a processing rule, the processing rule is corresponding to the control signaling.

Figure 2:
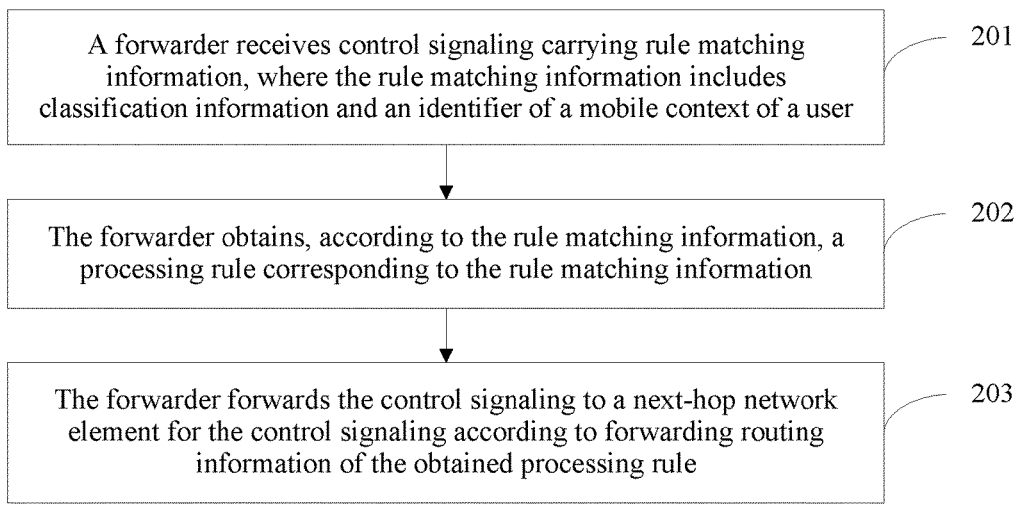
FIG. 2 is a schematic diagram of a first embodiment of a control signaling transmission method according to the present invention.

Referring to FIG. 2, FIG. 2 is a schematic diagram of a first embodiment of a control signaling transmission method according to an embodiment of the present invention. The method includes the following steps.

Step 201: A forwarder receives control signaling carrying rule matching information, where the rule matching information includes classification information and an identifier of a mobile context of user equipment.

In a possible implementation manner, before this step, the method may further include: receiving and saving, by the forwarder, a processing rule that is sent by a controller and that is related to the mobile context of the user equipment. The processing rule related to the mobile context of the user equipment is determined by the controller according to a route between the forwarder and a service network element or a route between the forwarder and a target network element.

In another possible implementation manner, before this step, the method may further include: when the mobile context of the user equipment is migrated from an original target network element to a new target network element, receiving, by the forwarder, a processing rule that is sent by a controller and that is related to the mobile context of the user equipment; and updating, according to the received processing rule, a processing rule that is locally saved by the forwarder and that is related to the mobile context of the user equipment. The processing rule received by the forwarder is determined by the controller according to a route between the forwarder and the new target network element, and the new target network element is a network element to which the mobile context of the user equipment belongs after the mobile context of the user equipment is migrated.

Step 202: The forwarder obtains, according to the rule matching information, a processing rule corresponding to the rule matching information, where the processing rule includes rule description information and forwarding routing information, the processing rule corresponding to the rule matching information is a processing rule whose rule description information matches the rule matching information, and the match between the rule description information and the rule matching information includes: a match between classification information in the rule description information and the classification information in the rule matching information, and a match between an identifier of a mobile context of user equipment in the rule description information and the identifier of the mobile context of the user equipment in the rule matching information.

In a possible implementation manner, the obtaining, by the forwarder according to the rule matching information, a processing rule corresponding to the rule matching information may include: finding, by the forwarder from processing rules saved by the forwarder and according to the rule matching information, the processing rule corresponding to the rule matching information.

The finding, by the forwarder from processing rules saved by the forwarder and according to the rule matching information, the processing rule corresponding to the rule matching information may include: searching, by the forwarder according to the rule matching information, rule description information in the processing rules saved by the forwarder; finding rule description information matching the rule matching information; and using a processing rule including the found rule description information as the processing rule corresponding to the rule matching information.

In another possible implementation manner, the obtaining, by the forwarder according to the rule matching information, a processing rule corresponding to the rule matching information may include:

sending, by the forwarder, a processing rule query request to a controller, where the request carries the rule matching information, and the processing rule query request is used to request the processing rule corresponding to the rule matching information; and receiving, by the forwarder, the processing rule that is sent by the controller and that corresponds to the rule matching information.

Step 203: The forwarder forwards the control signaling to a next-hop network element for the control signaling according to the forwarding routing information of the obtained processing rule.

The forwarding routing information of the processing rule may include a forwarding port.

The forwarding, by the forwarder, the control signaling to a next-hop network element according to the forwarding routing information of the obtained processing rule may include:

forwarding, by the forwarder, the control signaling to the next-hop network element by using the forwarding port.

In this embodiment, in an addressing process of a mobile context of user equipment, control signaling exchanged between a service network element and a target network element is not transmitted in an IP address manner, and a forwarder obtains, according to rule matching information in the control signaling, a processing rule corresponding to the rule matching information, and forwards the control signaling to a next-hop network element for the control signaling according to forwarding routing information of the obtained processing rule, so that the control signaling is exchanged between the service network element and the target network element by means of hop-by-hop forwarding by the forwarder. In addition, when the mobile context of the user equipment is migrated from an original target network element to a new target network element, only a related processing rule needs to be updated, without the need of signaling exchange across data centers, so that transmission resources of a cloud network are reduced.

Figure 3:
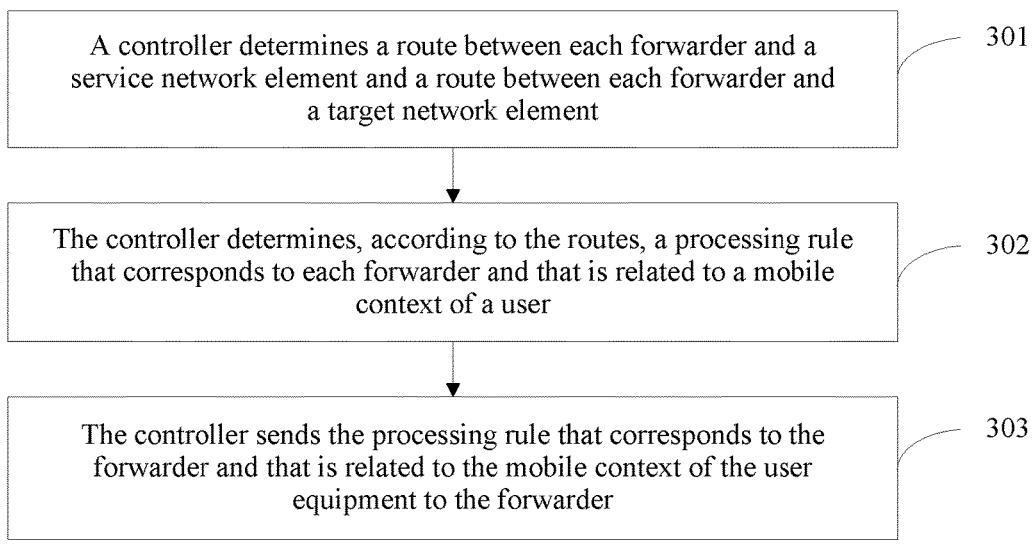
FIG. 3 is a schematic diagram of a second embodiment of a control signaling transmission method according to the present invention.

Referring to FIG. 3, FIG. 3 is a schematic diagram of a second embodiment of a control signaling transmission method according to the present invention. The method includes the following steps.

Step 301: A controller determines a route between a forwarder and a service network element and a route between the forwarder and a target network element, where the service network element is a network element accessed by user equipment, and the target network element is a network element to which a mobile context of the user equipment belongs.

Step 302: The controller determines, according to the route between the forwarder and the service network element and the route between the forwarder and the target network element, a processing rule that corresponds to the forwarder and that is related to the mobile context of the user equipment, the processing rule is used when the forwarder forwards, according to the processing rule, control signaling carrying rule matching information to a next-hop network element, the processing rule includes rule description information and forwarding routing information, the rule description information matches the rule matching information, the rule matching information includes classification information and an identifier of the mobile context of the user equipment, and the match between the rule description information and the rule matching information includes: a match between classification information in the rule description information and the classification information in the rule matching information, and a match between an identifier of a mobile context of user equipment in the rule description information and the identifier of the mobile context of the user equipment in the rule matching information.

Because the route between the forwarder and the target network element is used by the forwarder to forward control signaling that is sent from the service network element to the target network element, the controller may determine a first processing rule according to the route between the forwarder and the target network element, and the first processing rule is used to instruct the forwarder to forward the control signaling from the service network element to the target network element. Because the route between the forwarder and the service network element is used by the forwarder to forward control signaling that is sent from the target network element to the service network element, the controller may determine a second processing rule according to the route between the forwarder and the service network element, and the second processing rule is used to instruct the forwarder to forward the control signaling from the target network element to the service network element.

If rule description information in a processing rule may include classification information and an identifier of a mobile context of user equipment, and forwarding routing information in the processing rule includes a forwarding port, the following describes a possible implementation method for determining the first processing rule by the controller.

For the classification information, if the classification information is implemented by using a network element type such as an eNB or an MME, and assuming that the target network element is an MME, and the service network element is an eNB, the controller may determine, according to a route between the forwarder and the MME, that the classification information is the MME. Alternatively, if the classification information is implemented by using a network element type such as a target network element or a service network element, the controller may determine, according to a route between the forwarder and the target network element, that the classification information is the target network element. Alternatively, if the classification information is implemented by using a signaling type such as a service request or a service response, the controller may determine, according to a route between the forwarder and the target network element, that the classification information is the service request.

For the identifier of the mobile context of the user equipment, if the identifier of the mobile context of the user equipment is implemented by using an IMSI or a P-TMSI, the controller may directly determine the identifier of the mobile context of the user equipment in the rule description information according to the IMSI or the P-TMSI of the user equipment.

For the forwarding port, the controller may determine, according to the route between the forwarder and the target network element, a connection port between the forwarder and a next-hop network element for the forwarder in the route, and determine the connection port as the forwarding port in the forwarding routing information. If there are multiple connection ports between the forwarder and the next-hop network element for the forwarder, the controller may determine one of the connection ports as the forwarding port. For a specific method in which the controller determines a connection port as a forwarding port, this embodiment of the present invention sets no limitation.

If rule description information in a processing rule includes classification information and an identifier of a mobile context of user equipment, and forwarding routing information in the processing rule includes a forwarding port, the following describes a possible implementation method for determining the second processing rule by the controller.

For the classification information, if the classification information is implemented by using a network element type such as an eNB or an MME, and assuming that the target network element is an MME, and the service network element is an eNB, the controller may determine, according to a route between the forwarder and the eNB, that the classification information is the eNB. Alternatively, if the classification information is implemented by using a network element type such as a target network element or a service network element, the controller may determine, according to a route between the forwarder and the service network element, that the classification information is the service network element. Alternatively, if the classification information is implemented by using a signaling type such as a service request or a service response, the controller may determine, according to a route between the forwarder and the service network element, that the classification information is the service response.

For the identifier of the mobile context of the user equipment, if the identifier of the mobile context of the user equipment is implemented by using an IMSI or a P-TMSI, the controller may directly determine the identifier of the mobile context of the user equipment in the rule description information according to the IMSI or the P-TMSI of the user equipment.

For the forwarding port, the controller may determine, according to the route between the forwarder and the service network element, a connection port between the forwarder and a next-hop network element for the forwarder in the route, and determine the connection port as the forwarding port in the forwarding routing information. If there are multiple connection ports between the forwarder and the next-hop network element for the forwarder, the controller may determine one of the connection ports as the forwarding port. For a specific method in which the controller determines a connection port as a forwarding port, this embodiment of the present invention sets no limitation.

In subsequent embodiments shown in FIG. 4B-1 and FIG. 4B-2, FIG. 5B-1 and FIG. 5B-2, and FIG. 6B-1 and FIG. 6B-2, examples are used to describes how the controller determines a processing rule. For details, refer to step 403, step 503, step 602, and the like.

Step 303: The controller sends the processing rule that corresponds to the forwarder and that is related to the mobile context of the user equipment to the forwarder.

After step 302, the method may further include:

receiving, by the controller, a processing rule query request sent by the forwarder, where the request carries the rule matching information, and the processing rule query request is used to request a processing rule corresponding to the rule matching information;

obtaining, by the controller, the processing rule corresponding to the rule matching information; and sending, by the controller, the obtained processing rule corresponding to the rule matching information to the forwarder.

The obtaining, by the controller, the processing rule corresponding to the rule matching information may include:

searching, by the controller according to the rule matching information, rule description information in processing rules saved by the controller; finding rule description information matching the rule matching information; and using a processing rule including the found rule description information as the processing rule corresponding to the rule matching information.

Before step 301, the method may further include: receiving, by the controller, a first path switch request message sent by the target network element, where the first path switch request message includes an identifier of the user equipment and an identifier of the target network element, and the first path switch request message is used to request the controller to determine the processing rule that corresponds to the forwarder and that is related to the mobile context of the user equipment.

This embodiment of the present invention may further include:

when the mobile context of the user equipment is migrated from an original target network element to a new target network element, receiving, by the controller, a second path switch request message sent by the new target network element, where the second path switch request message includes the identifier of the user equipment and an identifier of the new target network element, and the second path switch request message is used to request the controller to determine the processing rule that corresponds to the forwarder and that is related to the mobile context of the user equipment;

determining, by the controller, a route between the forwarder and the new target network element indicated by the identifier of the new target network element; and determining, by the controller according to the determined route between the forwarder and the new target network element, a processing rule that corresponds to each forwarder and that is related to the mobile context of the user equipment.

In this embodiment, a controller determines a route between a forwarder and a service network element and a route between the forwarder and a target network element, and determines, according to the routes, a processing rule that corresponds to the forwarder and that is related to a mobile context of user equipment, so that the forwarder forwards, according to the processing rule, control signaling carrying rule matching information to a next-hop network element for the control signaling, thereby ensuring that the forwarder can forward control signaling exchanged between the service network element and the target network element.

Figure 4A:
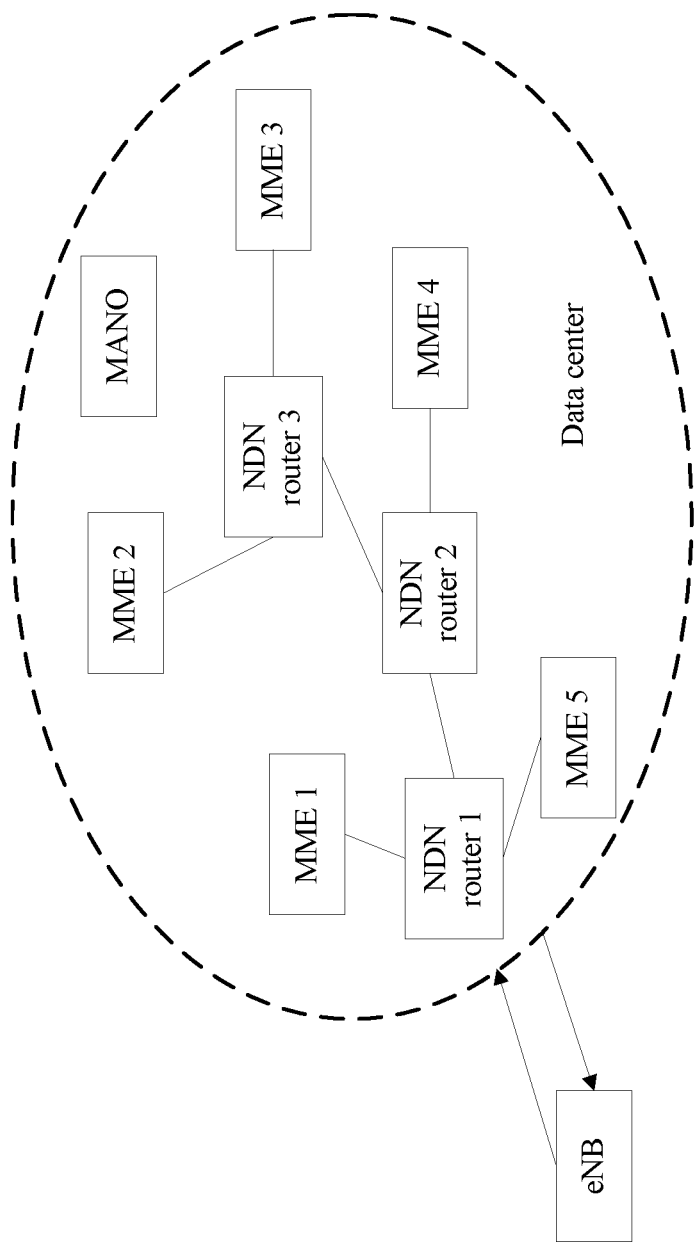
FIG. 4A is a schematic diagram of an application scenario 1 of a control signaling transmission method according to the present invention.

Referring to FIG. 4A, FIG. 4A is a schematic diagram of an application scenario of a control signaling transmission method according to an embodiment of the present invention. The scenario is based on a new data network (NDN, New Data Network). In the NDN network, forwarding between network elements is implemented in an NDN manner, and a forwarder is an NDN router. A mobile context is deemed as information. Control signaling is named, and a context identifier is used as a keyword to name the control signaling. A processing rule is a router entry that is based on the context identifier and classification information. In FIG. 4A, an MME 1 to an MME 5 are deployed in a data center, and an NDN router is used for information forwarding during communication between MMEs and between an MME and the outside. FIG. 4A shows three NDN routers in total: an NDN router 1 to an NDN router 3. As a service network element serving user equipment, an eNB initiates a service request procedure, and performs mobile context information addressing and processing in the data center. A target network element is an MME in the MME 1 to the MME 5, the forwarder is the NDN routers, and a controller is a MANO. In this scenario, the MME and the service request procedure are used as an example. The control signaling transmission method in this embodiment of the present invention may be further applied to a control signaling forwarding scenario for a service related to an eNB, an HSS, a gateway, or another network element. Details are not described herein one by one.

Figures 1, 4B:
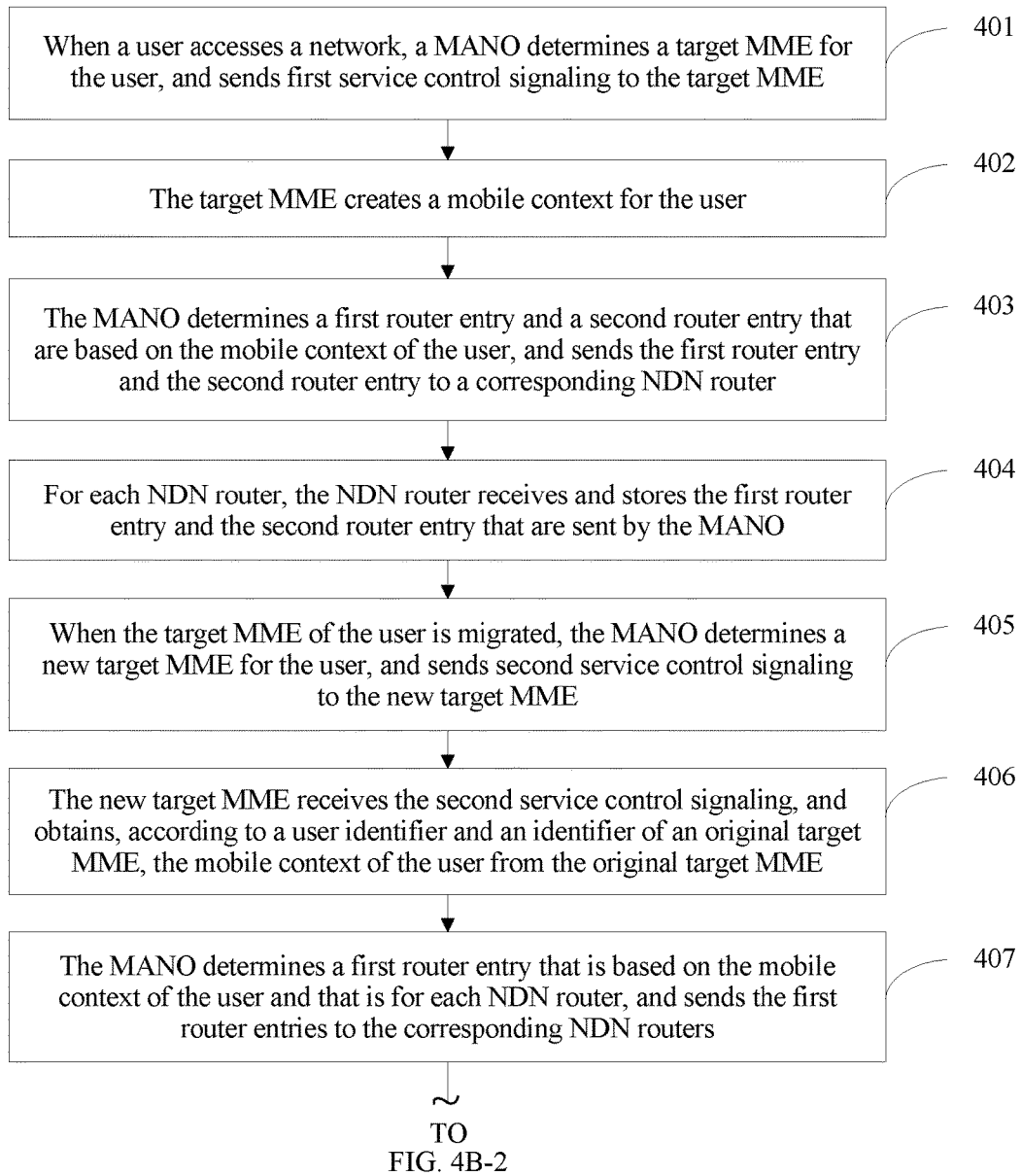
Figures 2, 4B:
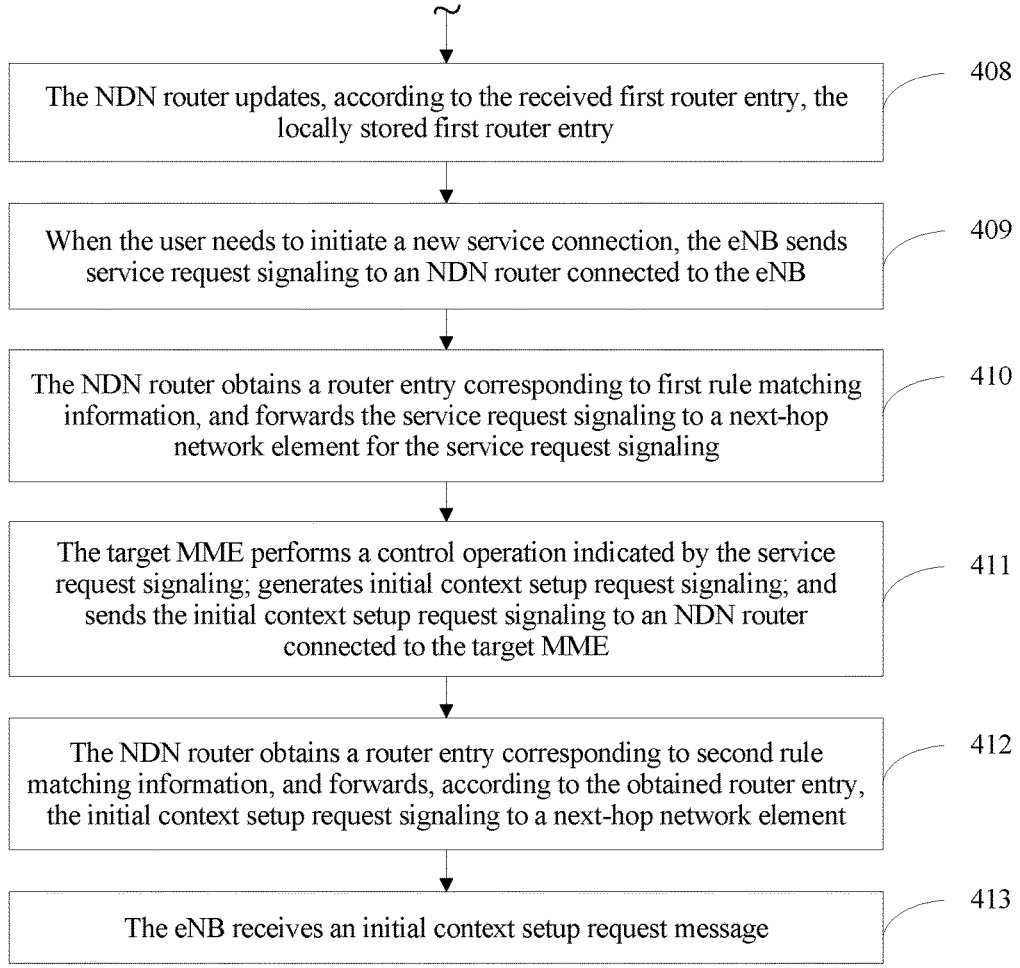

In FIG. 4B-1 and FIG. 4B-2, with reference to FIG. 4A, implementation of the control signaling transmission method in this embodiment of the present invention is described. The method includes the following steps.

Step 401: When user equipment accesses a network, a MANO determines a target MME for the user equipment, and sends first service control signaling to the target MME, where the first service control signaling carries an identifier of the user equipment, and the first service control signaling is used to instruct the target MME to create a mobile context for the user equipment.

The target MME determined by the MANO for the user equipment may be the existing MME, or may be an MME newly established for the user equipment, and this is not limited herein.

For example, with reference to FIG. 4A, when user equipment A accesses the network, the MANO may determine an MME 2 as a target MME of the user equipment A, and send first service control signaling to the MME 2. The first service control signaling carries an identifier of the user equipment A, and instructs the MME 2 to create a mobile context for the user equipment A.

Step 402: The target MME creates the mobile context for the user equipment.

For a method in which the target MME creates the mobile context for the user equipment, details are not described in the present invention.

With reference to the foregoing example, in this step, the target MME creates the mobile context for the user equipment A.

Step 403: The MANO determines, for each NDN router according to a route from each NDN router to the target MME, a first router entry that is based on the mobile context of the user equipment; determines, for each NDN router according to a route from each NDN router to an eNB, a second router entry that is based on the mobile context of the user equipment; and sends the determined first router entries and second router entries that are based on the mobile context of the user equipment to the corresponding NDN routers.

Both the first router entry and the second router entry in this embodiment are router entries based on the mobile context of the user equipment. The first router entry and the second router entry described in this embodiment are mainly used to distinguish between two router entries determined by the MANO.

A router entry may include rule description information and forwarding routing information. The rule description information may include: an identifier of a mobile context of user equipment and classification information. The identifier of the mobile context may be implemented by using an IMSI of the user equipment, and the classification information may include an MME and an eNB. The forwarding routing information may be implemented by using information about a forwarding port for control signaling in the NDN router.

In this step, classification information of the first router entry may be the MME, and classification information of the second router entry may be the eNB. Both identifiers of mobile contexts of user equipment in the first router entry and the second router entry are the IMSI of the user equipment. Forwarding routing information in the first router entry is determined according to a route from the NDN router to the target MME, and forwarding routing information in the second router entry is determined according to a route from the NDN router to the eNB.

For each NDN router, the MANO may determine a forwarding port in the first router entry according to a route from the NDN router to the target MME. For each NDN router, the MANO determines the forwarding port according to a port connecting the NDN router and a next-hop network element for the NDN router. For example, a next-hop network element for the NDN router 1 in a route from the NDN router 1 to an MME 4 is an NDN router 2, and the NDN router 1 is connected to the NDN router 2 by using a port 1, so that for the NDN router 1, the MANO determines a forwarding port in a first router entry for the NDN router 1 as the port 1.

For example, it is assumed that the first router entry for the NDN router 1 is:

FIT entry: ID: 460030912121001-MME, face ID: 2.

It may indicate that control signaling in which an identifier of a mobile context of user equipment is 460030912121001 and classification information is an MME is forwarded to a forwarding port 2 of the NDN router 1. The "FIT entry" part corresponds to rule description information (a mobile context identifier+classification information), and the "face ID" part corresponds to a forwarding route (a forwarding port).

Each NDN router corresponds to a first router entry and a second router entry that are based on the context identifier of the user equipment. When the MANO sends the determined first router entries and second router entries to the corresponding NDN routers, the MANO may directly send, to each NDN router, a first router entry and a second router entry that correspond to each NDN router, or the MANO may send the first router entries and the second router entries to the target MME, and the target MME sends, to each NDN router, a first router entry and a second router entry that correspond to each NDN router. In a possible implementation manner, the first router entry and the second router entry may be carried in an OSPF message, and sent to the corresponding NDN router.

With reference to the foregoing example, in this step, the MANO determines a first router entry and a second router entry that are based on the mobile context of the user equipment A and that are for each NDN router, and sends the first router entries and the second router entries that are based on the mobile context of the user equipment A to the corresponding NDN routers.

The NDN router related in this step may be one or more of the NDN routers in the data center. Preferably, the NDN router related in this step may be an NDN router around the target MME, provided that control signaling can be transmitted between the eNB and the target MME by using the NDN router related in this step. In this embodiment, for a specific method in which the MANO determines the NDN router around the target MME, details are not described herein.

Step 404: For each NDN router, the NDN router receives and saves the first router entry and the second router entry sent by the MANO.

For the NDN router, both the first router entry and the second router entry are router entries, and can be directly saved in a corresponding routing table. For a specific storage method, details are not described herein.

Step 405: When the target MME of the user equipment is migrated, the MANO determines a new target MME for the user equipment, and sends second service control signaling to the new target MME, where the second service control signaling carries the identifier of the user equipment and an identifier of an original target MME, and the second service control signaling is used to instruct the new target MME to obtain the mobile context of the user equipment from the original target MME.

A trigger condition in which the target MME of the user equipment is migrated may be as follows: The original target MME actively initiates migration of the target MME according to a load status, or the MANO initiates migration of the target MME according to a load status of the original target MME, or the like.

The new target MME determined by the MANO for the user equipment may be the existing MME, or may be an MME newly established for the user equipment, and this is not limited herein.

The MANO may determine the new target MME for the user equipment according to a condition such as a load status of a surrounding MME, or a physical topology distance between a location of the user equipment and a current cloud network. For a specific determining method, details are not described herein.

The target MME in this embodiment of the present invention, including the new target MME and the original target MME, may be an MME VNF.

Step 406: The new target MME receives the second service control signaling, and obtains, according to the identifier of the user equipment and the identifier of the original target MME, the mobile context of the user equipment from the original target MME.

For example, with reference to the foregoing example and FIG. 4A, when the target MME of the user equipment is migrated, assuming that the original target MME of the user equipment is the MME 1, and the MANO determines the MME 2 as the new target MME of the user equipment, the MANO sends second service control signaling to the MME 2, and the second service control signaling carries the identifier of the user equipment and an identifier of the MME 1. Afterwards, the MME 2 obtains the mobile context of the user equipment from the MME 1 according to the identifier of the user equipment and the identifier of the MME 1.

For a method in which the new target MME obtains the mobile context of the user equipment from the original target MME, details are not described herein.

Step 407: The MANO determines, for each NDN router according to a route between each NDN router and the new target MME, the first router entry that is based on the mobile context of the user equipment, and sends the determined first router entries that are based on the mobile context of the user equipment to the corresponding NDN routers.

For example, with reference to the foregoing example, the MANO determines, for each NDN router according to a route between each NDN router and the MME 2, a first router entry that is based on the mobile context of the user equipment A, and sends the determined first router entries to the corresponding NDN routers. For a method in which the MANO determines the first router entry, refer to description of step 403 in which the MANO determines the first router entry. Details are not described herein again.

Step 408: For each NDN router, the NDN router updates, according to the received first router entry that is based on the mobile context of the user equipment, a locally saved first router entry that is based on the mobile context of the user equipment.

The NDN router may search for, from the locally saved first router entry, a router entry whose rule description information is the same as rule description information of the received first router entry, and update the found router entry to the received first router entry.

Because the rule description information of the found router entry is the same as the rule description information of the received first router entry, the found router entry is certainly the locally saved first router entry that is based on the mobile context of the user equipment.

The NDN router updates the locally saved first router entry to the received first router entry, so that when the target MME of the user equipment is migrated, a router entry in the NDN router is updated, and it is ensured that control signaling can be subsequently exchanged between the eNB and the new target MME and based on addressing of the mobile context of the user equipment.

For example, with reference to the foregoing example, in step 404, the NDN router saves the first router entry that is based on the mobile context of the user equipment A. In this step, the NDN router receives the first router entry that is based on the mobile context of the user equipment A and that is newly determined by the MANO in step 407.

An execution sequence between steps 405 to 406 and steps 407 to 408 is not limited.

Steps 405 to 408 are a process of updating the first router entry in the NDN router when the target MME of the user equipment is migrated. In practical application, the target MME of the user equipment may be not migrated, or the target MME of the user equipment may be migrated after the user equipment initiates several service connections. Therefore, there is no absolute execution sequence between steps 405 to 408 and subsequent steps 409 to 413.

Step 409: When the user equipment needs to initiate a new service connection, the eNB sends service request (Service Request) signaling to an NDN router connected to the eNB, where the service request signaling includes first rule matching information.

The service request signaling may be NAS signaling, and may be implemented by using an NDN packet. A context identifier of the NDN packet is the first rule matching information.

The first rule matching information may include: an identifier of a mobile context of user equipment and classification information of sending to the MME.

For example, with reference to the foregoing example, when the user equipment A needs to initiate a new service connection, the eNB sends service request signaling to the NDN router 1 connected to the eNB. First rule matching information of the service request signaling may include: an identifier of a mobile context of the user equipment A and classification information of sending to the MME.

Step 410: The NDN router obtains, according to the first rule matching information, a router entry corresponding to the first rule matching information, and forwards, according to the router entry, the service request signaling to a next-hop network element for the service request signaling.

If a next-hop network element is an NDN router, the next-hop network element continues to forward the service request signaling according to step 409 until the next-hop network element is the target MME. At that time, perform step 410.

If a next-hop network element is the target network element, perform step 410.

The obtaining, by the NDN router according to the first rule matching information, a router entry corresponding to the first rule matching information may include: matching, by the NDN router, the first rule matching information against rule description information of locally saved router entries; and using a router entry whose rule description information matches the first rule matching information as the router entry corresponding to the first rule matching information.

For example, with reference to the foregoing example, in this step, the NDN router 1 obtains, by means of matching according to the first rule matching information, the updated first router entry in step 408, and forwards, according to the first router entry, the service request signaling to a next-hop network element, such as the NDN router 2.

Step 411: The target MME obtains a corresponding mobile context according to a context identifier in the first rule matching information; performs, according to the mobile context, a control operation indicated by the service request signaling; generates initial context setup request (Initial Context Setup Request) signaling carrying second rule matching information; and sends the initial context setup request signaling to an NDN router connected to the target MME.

The second rule matching information may include: an identifier of a mobile context of user equipment and classification information of sending to the eNB.

For example, with reference to the foregoing example and FIG. 4A, the target MME sends initial context setup request signaling to the NDN router 2, and second rule matching information in the initial context setup request signaling may include: the identifier of the mobile context of the user equipment A and classification information of sending to the eNB.

Step 412: The NDN router obtains, according to the second rule matching information, a router entry corresponding to the second rule matching information, and forwards, according to the obtained router entry, the initial context setup request signaling to a next-hop network element for the initial context setup request signaling.

If a next-hop network element is the NDN router, the next-hop network element continues to forward the initial context setup request signaling according to step 412 until the next-hop network element is the eNB. At that time, perform step 413.

If a next-hop network element is the eNB, perform step 413.

For example, with reference to the foregoing example, in this step, the NDN router 2 obtains, by means of matching according to the second rule matching information, the second router entry saved in step 404, and forwards, according to the second router entry, the initial context setup request signaling to a next-hop network element, such as the NDN router 1.

Step 413: The eNB receives an initial context setup request message.

Afterwards, for a method in which the eNB performs subsequent processing according to the initial context setup request message, details are not described in this embodiment of the present invention.

In this embodiment, control signaling is transmitted between an eNB and a target MME and based on addressing of a mobile context of user equipment. When the target MME of the user equipment is migrated, a MANO determines, for each NDN router according to a route between each NDN router and a new target MME, a first router entry that is based on the mobile context of the user equipment; and uses the determined first router entry to update a first router entry saved in each NDN router. It is ensured that the control signaling can be subsequently exchanged between the eNB and the new target MME based on the addressing of the mobile context of the user equipment. This process is completed within a data center, without the need of signaling exchange across data centers, so that transmission resources of a cloud network are reduced, more flexible and high-efficient resource scheduling within the cloud network is implemented, and mobile controllability and running efficiency of the cloud network are improved. In addition, an internal topology structure of the data center is shielded from the outside. The present invention is applicable to an environment in which virtualized control network elements are frequently dynamically migrated, and plug-and-play of a mobile network element function is implemented.

Figure 5A:
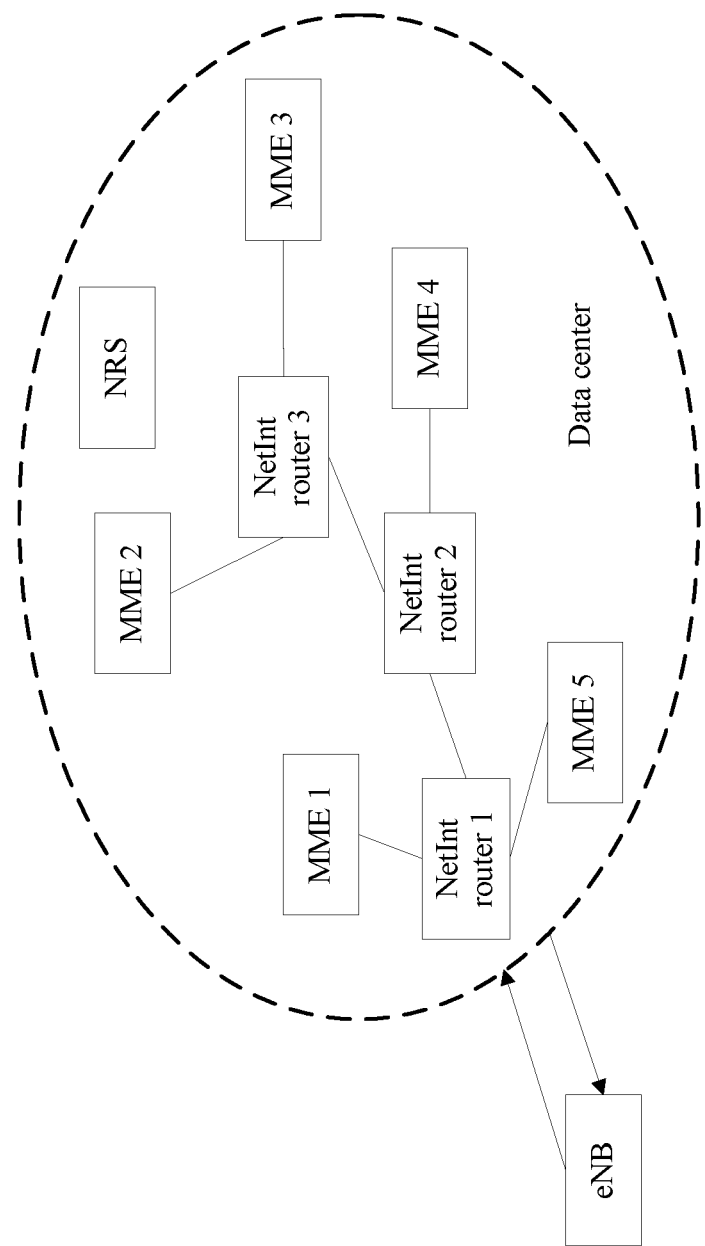
FIG. 5A is a schematic diagram of an application scenario 2 of a control signaling transmission method according to the present invention.

Referring to FIG. 5A, FIG. 5A is a schematic diagram of another application scenario of a control signaling transmission method according to an embodiment of the present invention. The scenario is based on a NetInf network. In the NetInf network, forwarding between network elements is implemented in a NetInf manner, a forwarder is a NetInf router, and a processing rule is a router entry that is based on a context identifier and classification information. In the NetInf network, the processing rule is saved by a naming resolution system (NRS). In FIG. 5A, an MME 1 to an MME 5 are deployed in a data center, and information is forwarded between MMES by using a NetInf router. FIG. 5A shows three NetInf routers in total: a NetInf router 1 to a NetInf router 3. As a service network element serving user equipment, an eNB initiates a service request (Service Request) procedure, and performs mobile context information addressing and processing in the data center. A target network element is an MME in the MME 1 to the MME 5, the forwarder is the NetInf routers, and a controller is the NRS. In this scenario, the MME and the service request procedure are used as an example. The control signaling transmission method in this embodiment of the present invention may be further applied to a control signaling forwarding scenario for a service related to an eNB, an HSS, a gateway, or another network element. Details are not described herein one by one.

Figures 1, 5B:
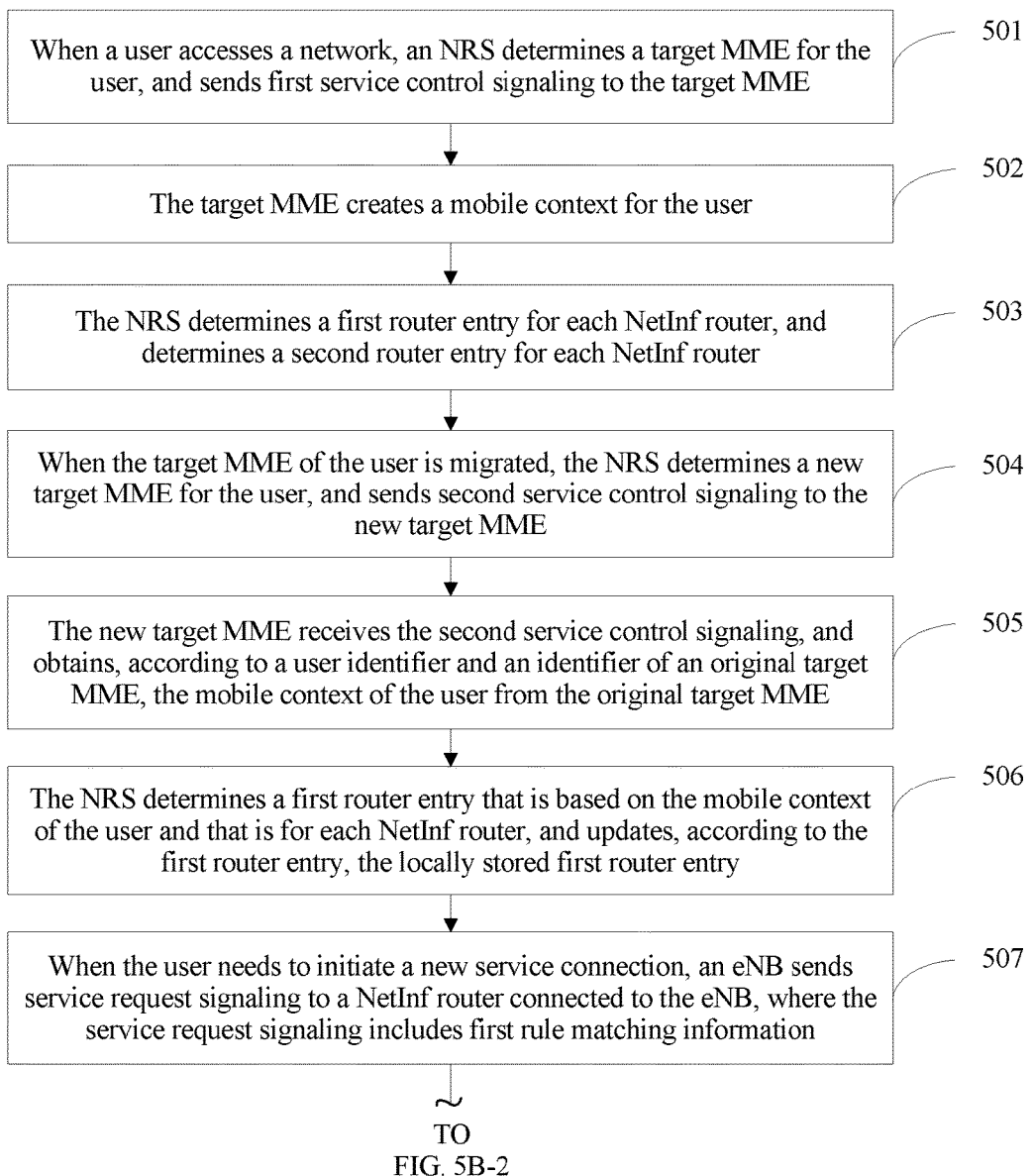
Figures 2, 5B:
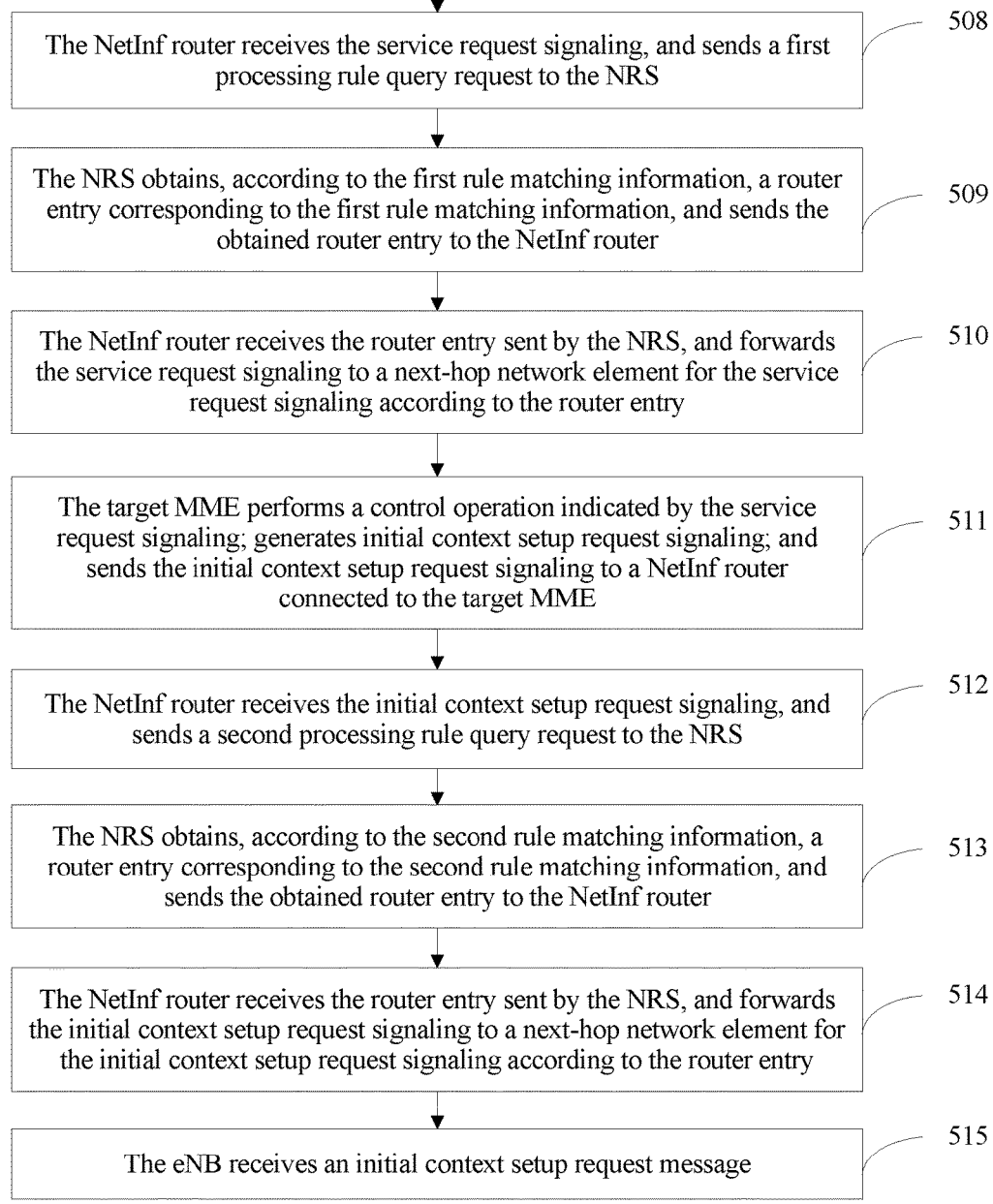

In FIG. 5B-1 and FIG. 5B-2, with reference to FIG. 5A, implementation of the control signaling transmission method in this embodiment of the present invention is described. The method includes the following steps.

Step 501: When user equipment accesses a network, an NRS determines a target MME for the user equipment, and sends first service control signaling to the target MME, where the first service control signaling carries an identifier of the user equipment, and the first service control signaling is used to instruct the target MME to create a mobile context for the user equipment.

For implementation of this step, refer to related description in step 401. A difference lies only in that an execution body is the NRS instead of a MANO.

Step 502: The target MME creates the mobile context for the user equipment.

For implementation of this step, refer to step 402.

Step 503: The NRS determines, for each NetInf router according to a route from each NetInf router to the target MME, a first router entry that is based on the mobile context of the user equipment; and the NRS determines, for each NetInf router according to a route from each NetInf router to an eNB, a second router entry that is based on the mobile context of the user equipment.

For implementation of this step, refer to related description in step 403. A difference lies only in that an execution body is the NRS instead of the MANO, and a router is the NetInf router instead of an NDN router.

For example, the first router entry may be:
FIT entry: ID: 460030912121001-SR, face ID: 2.

It may indicate that control signaling in which an identifier of a mobile context of user equipment is 460030912121001 and classification information is a service request (SR, Service Request) is forwarded to a forwarding port 2 of the NDN router 1. The "FIT entry" part corresponds to rule description information (a mobile context identifier+classification information), and the "face ID" part corresponds to a forwarding route (a forwarding port).

Step 504: When the target MME of the user equipment is migrated, the NRS determines a new target MME for the user equipment, and sends second service control signaling to the new target MME, where the second service control signaling carries the identifier of the user equipment and an identifier of an original target MME, and the second service control signaling is used to instruct the new target MME to obtain the mobile context of the user equipment from the original target MME.

For implementation of this step, refer to related description in step 405. A difference lies only in that an execution body is the NRS instead of the MANO.

Step 505: The new target MME receives the second service control signaling, and obtains, according to the identifier of the user equipment and the identifier of the original target MME, the mobile context of the user equipment from the original target MME.

For implementation of this step, refer to step 406.

Step 506: The NRS determines, for each NetInf router according to a route between each NetInf router and the new target MME, the first router entry that is based on the mobile context of the user equipment, and updates, according to the determined first router entry that is based on the mobile context of the user equipment, a locally saved first router entry that is based on the mobile context of the user equipment.

For implementation of this step, refer to related description in step 407 and step 408. A difference lies only in that an execution body is replaced with the NRS, and a router is the NetInf router instead of the NDN router.

Step 507: When the user equipment needs to initiate a new service connection, the eNB sends service request signaling to a NetInf router connected to the eNB, where the service request signaling includes first rule matching information.

For implementation of this step, refer to related description in step 409. A difference lies only in that the eNB is connected to the NetInf router instead of the NDN router.

Step 508: The NetInf router receives the service request signaling, and sends a first processing rule query request to the NRS, where the first processing rule query request carries the first rule matching information.

Step 509: The NRS obtains, according to the first rule matching information, a router entry corresponding to the first rule matching information, and sends the obtained router entry to the NetInf router.

The obtaining, by the NRS according to the first rule matching information, a router entry corresponding to the first rule matching information may include: matching, by the NRS, the first rule matching information against rule description information of locally saved router entries; and using the router entry whose rule description information matches the first rule matching information as the router entry corresponding to the first rule matching information.

Step 510: The NetInf router receives the router entry sent by the NRS, and forwards the service request signaling to a next-hop network element for the service request signaling according to the router entry.

If a next-hop network element is a NetInf router, the next-hop network element continues to forward the service request signaling according to steps 508 to 510 until the next-hop network element is the target MME. At that time, perform step 511.

If a next-hop network element is the target MME, perform step 511.

Step 511: The target MME obtains a corresponding mobile context according to a context identifier in the first rule matching information; performs, according to the mobile context, a control operation indicated by the service request signaling; generates initial context setup request signaling carrying second rule matching information; and sends the initial context setup request signaling to a NetInf router connected to the target MME.

Step 512: The NetInf router receives the initial context setup request signaling, and sends a second processing rule query request to the NRS, where the second processing rule query request carries the second rule matching information.

The second rule matching information may include: an identifier of a mobile context of user equipment and classification information of sending to the eNB.

Step 513: The NRS obtains, according to the second rule matching information, a router entry corresponding to the second rule matching information, and sends the obtained router entry to the NetInf router.

Step 514: The NetInf router receives the router entry sent by the NRS, and forwards the initial context setup request signaling to a next-hop network element for the initial context setup request signaling according to the router entry.

If a next-hop network element is a NetInf router, the next-hop network element continues to forward the initial context setup request signaling according to steps 512 to 514 until the next-hop network element is the eNB. At that time, perform step 515.

If a next-hop network element is the eNB, perform step 515.

Step 515: The eNB receives an initial context setup request message.

Afterwards, for a method in which the eNB performs subsequent processing according to the initial context setup request message, details are not described in this embodiment of the present invention.

In this embodiment, all router entries are saved in an NRS, and when forwarding control signaling that is based on addressing of a mobile context of user equipment, a NetInf router obtains a corresponding router entry from the NRS, and forwards the control signaling according to the obtained router entry, so that the control signaling is transmitted between an eNB and a target MME and based on the addressing of the mobile context of the user equipment. In addition, when the target MME of the user equipment is migrated, the NRS determines, for each NDN router according to a route between each NDN router and a new target MME, a first router entry that is based on the mobile context of the user equipment, and updates a locally saved first router entry. It is ensured that the control signaling can be subsequently exchanged between the eNB and the new target MME based on the addressing of the mobile context of the user equipment. This process is completed within the NRS, without the need of signaling exchange across data centers, so that transmission resources of a cloud network are reduced, more flexible and high-efficient resource scheduling within the cloud network is implemented, and mobile controllability and running efficiency of the cloud network are improved. In addition, an internal topology structure of the data center is shielded from the outside. The present invention is applicable to an environment in which virtualized control network elements are frequently dynamically migrated, and plug-and-play of a mobile network element function is implemented.

Figure 6A:
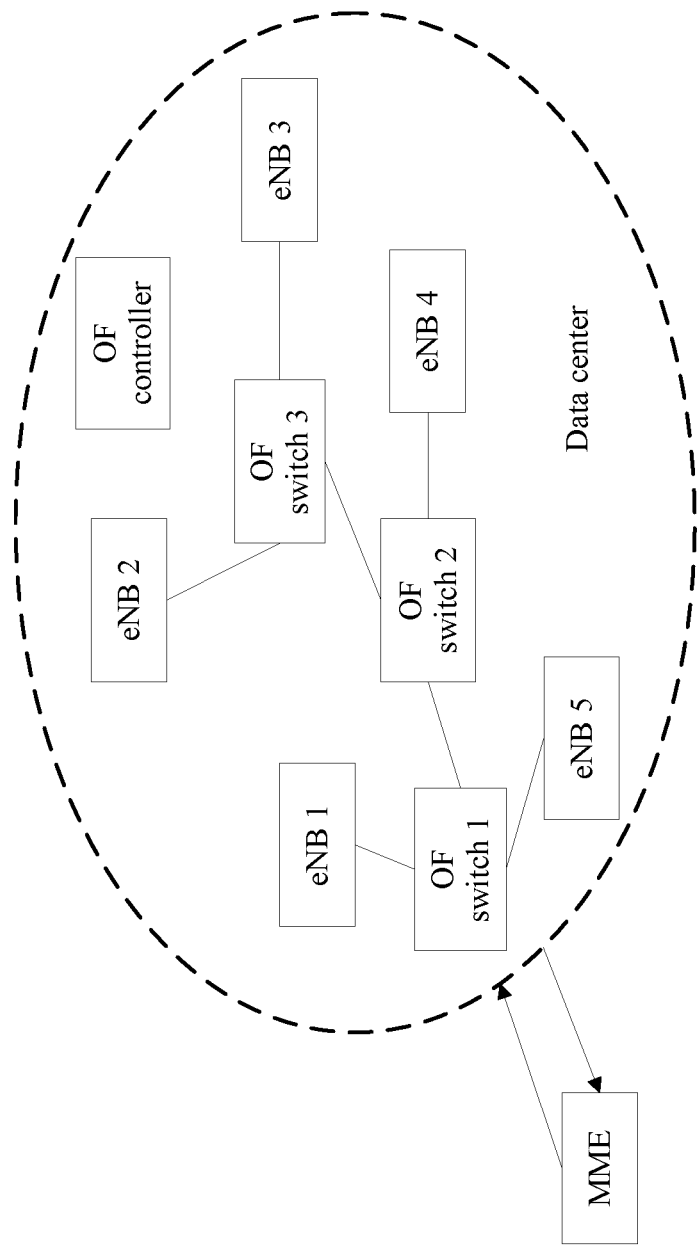
FIG. 6A is a schematic diagram of an application scenario 3 of a control signaling transmission method according to the present invention.

Referring to FIG. 6A, FIG. 6A is a schematic diagram of another application scenario of a control signaling transmission method according to an embodiment of the present invention. The scenario is based on a software-defined networking (SDN) network. In the SDN network, forwarding between network elements is implemented in an SDN manner, a forwarder is an OF switch, and a processing rule is a flow entry that is based on a context identifier and classification information. In FIG. 6A, an eNB 1 to an eNB 5 form a radio access cloud network, and information is forwarded by using an OF switch during communication between eNBs and between an eNB and the outside. FIG. 6A shows three OF switches in total: an OF switch 1 to an OF switch 3. The radio access cloud network is managed by an OF controller that is based on the OpenFlow (OF) protocol (a connection between the OF controller and the OF switches is not shown). As a service network element serving user equipment, an MME initiates a session management (Session management) procedure, and performs mobile context information addressing and processing in the radio access cloud network. A target network element is an eNB in the eNB 1 to the eNB 5, the forwarder is the OF switches, and a controller is the OF controller. In this scenario, the eNB and the session management procedure are used as an example. The control signaling transmission method in this embodiment of the present invention may be further applied to a control signaling forwarding scenario for a service related to an eNB, an HSS, a gateway, or another network element. Details are not described herein one by one.

In this embodiment, the eNB may be a physical base station device, or may be a distributed base station, and a logical function of the eNB is provided by a VNF running in a virtual machine. This is not limited in this application. The OF switch may be a physical SDN switch, or may be a virtual OF switch running in a virtual machine. An identifier of a mobile context may be implemented by using an IMSI or a P-TMSI of the user equipment.

Figures 1, 6B:
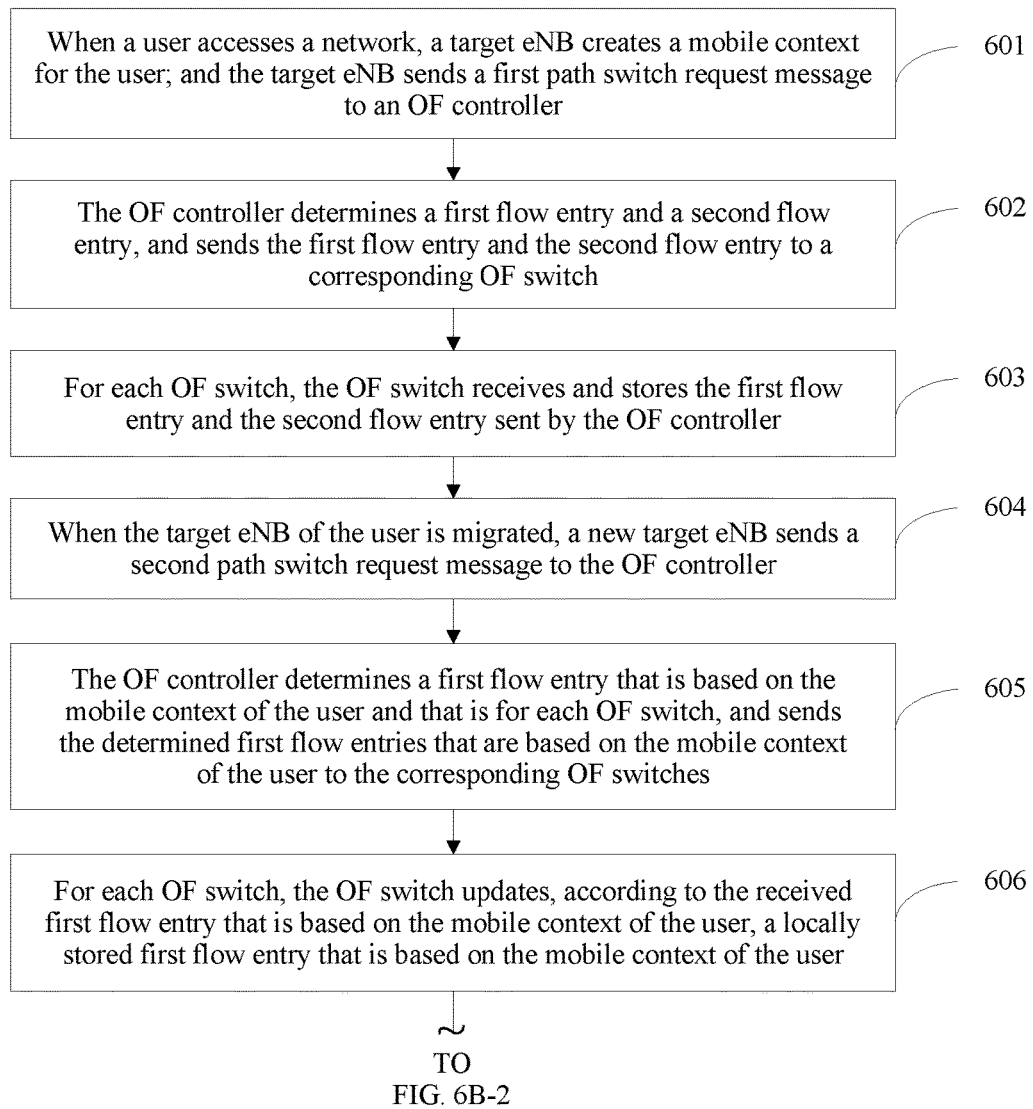

In FIG. 6B-1 and FIG. 6B-2, with reference to FIG. 6A, implementation of the control signaling transmission method in this embodiment of the present invention is described. The method includes the following steps.

Step 601: When user equipment accesses a network, a target eNB creates a mobile context for the user equipment; and the target eNB sends a first path switch request (Path Switch Request) message to an OF controller, where the first path switch request message includes an identifier of the user equipment and an identifier of the target eNB.

The identifier of the user equipment may be an international mobile subscriber identity (IMSI, International Mobile Subscriber Identity) or a temporary mobile subscriber identity (P-TMSI, Packet Temperate Mobile Subscription Identity).

Step 602: The OF controller determines, for each OF switch according to a route from each OF switch to the target eNB, a first flow entry that is based on the mobile context of the user equipment; determines, for each OF switch according to a route from each OF switch to an MME, a second flow entry that is based on the mobile context of the user equipment; and sends the determined first flow entries and second flow entries that are based on the mobile context of the user equipment to the corresponding OF switches.

Both the first flow entry and the second flow entry are flow entries based on the mobile context of the user equipment. In this embodiment of the present invention, the first flow entry is distinguished from the second flow entry, so that the OF controller distinguishes between flow entries that are determined according to different routes.

For implementation of this step, refer to related description in step 403. A difference lies only in that an execution body is replaced with the OF controller, and an NDN router is replaced with the OF switch.

Step 603: For each OF switch, the OF switch receives and saves the first flow entry and the second flow entry sent by the OF controller.

For the OF switch, both the received first flow entry and second flow entry are flow entries, and there is no difference in essence.

Step 604: When the target eNB of the user equipment is migrated, a new target eNB sends a second path switch request message to the OF controller, where the second path switch request message includes the identifier of the user equipment and an identifier of the new target eNB.

Step 605: The OF controller determines, for each OF switch according to a route from each OF switch to the new target eNB, the first flow entry that is based on the mobile context of the user equipment, and sends the determined first flow entries that are based on the mobile context of the user equipment to the corresponding OF switches.

For implementation of this step, refer to related description in step 407. A difference lies only in that an execution body is replaced with the OF controller, and the NDN router is replaced with the OF switch.

Step 606: For each OF switch, the OF switch updates, according to the received first flow entry that is based on the mobile context of the user equipment, a locally saved first flow entry that is based on the mobile context of the user equipment.

The OF switch may search for, from locally saved flow entries, a flow entry whose rule description information is the same as rule description information of the received first flow entry, and update the found flow entry to the received first flow entry.

Because the rule description information of the found flow entry is the same as the rule description information of the received first flow entry, the found flow entry is certainly the locally saved first flow entry that is based on the mobile context of the user equipment.

The OF switch updates the locally saved first flow entry to the received first flow entry, so that when the target eNB of the user equipment is migrated, a flow entry in the OF switch is updated, and it is ensured that control signaling can be subsequently exchanged between the MME and the new target eNB and based on addressing of the mobile context of the user equipment. This flow entry update process is completed only between the OF controller and the OF switches, and signaling exchange across data centers does not exist, so that transmission resources in a network are reduced.

Step 607: When the user equipment needs to initiate a new service connection, the MME sends service management request (Service Management Request) signaling to an OF switch connected to the MME, where the signaling includes first rule matching information.

A new service may include bearer modification, dedicated bearer setup, or the like that is initiated by the MME.

The signaling may be implemented in an existing packet tunnel encapsulation manner, such as a GRE encapsulation format. The first rule matching information is used as a Generic Routing Encapsulation (GRE, Generic Routing Encapsulation) Key; or the signaling may be implemented by using a new user-defined packet header field.

The first rule matching information may include: an identifier of a mobile context of user equipment and classification information of sending to the eNB.

Step 608: The OF switch obtains, according to the first rule matching information, a flow entry corresponding to the first rule matching information, and forwards, according to the flow entry, the service management request signaling to a next-hop network element for the service management request signaling.

If a next-hop network element is an OF switch, the next-hop network element continues to forward the service management request signaling according to step 608 until the next-hop network element is the target eNB. At that time, perform step 609.

If a next-hop network element is the target eNB, perform step 609.

Step 609: The target eNB obtains a corresponding mobile context according to a context identifier in the first rule matching information; performs, according to the mobile context, a control operation indicated by the service management request signaling; generates session management response (session management response) signaling carrying second rule matching information; and sends the session management response signaling to an OF switch connected to the target eNB.

The second rule matching information includes: an identifier of a mobile context of user equipment and classification information of sending to the MME.

Step 610: The OF switch obtains, according to the second rule matching information, a flow entry corresponding to the second rule matching information, and forwards, according to the flow entry, the session management response signaling to a next-hop network element for the session management response signaling.

If a next-hop network element is an OF switch, the next-hop network element continues to forward the session management response signaling according to step 610 until the next-hop network element is the MME. At that time, perform step 611.

If a next-hop network element is the MME, perform step 611.

Step 611: The MME receives a session management response message.

Afterwards, for a method in which the MME performs subsequent processing according to the session management response message, details are not described in this embodiment of the present invention.

In this embodiment, control signaling is transmitted between an MME and a target eNB and based on addressing of a mobile context of user equipment; and when the target eNB of the user equipment is migrated, an OF controller determines, for each OF switch according to a route between each OF switch and a new target eNB, a first flow entry that is based on the mobile context of the user equipment, and uses the determined first flow entry to update a first flow entry saved in each OF switch. It is ensured that the control signaling can be subsequently exchanged between the MME and the new target eNB based on the addressing of the mobile context of the user equipment. This process is completed within a data center, without the need of signaling exchange across data centers, so that transmission resources of a cloud network are reduced, more flexible and high-efficient resource scheduling within the cloud network is implemented, and mobile controllability and running efficiency of the cloud network are improved. In addition, an internal topology structure of the data center is shielded from the outside. The present invention is applicable to an environment in which virtualized control network elements are frequently dynamically migrated, and plug-and-play of a mobile network element function is implemented.

Figure 7A:
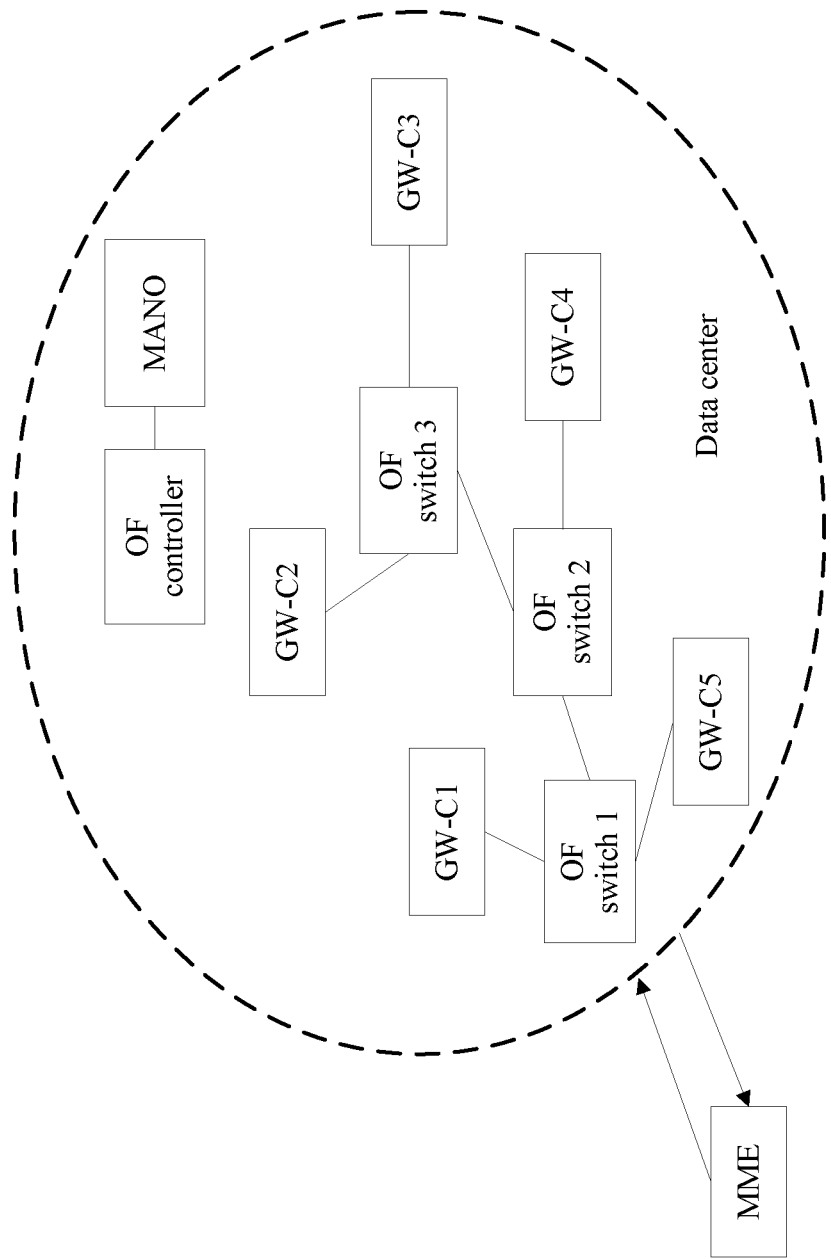
FIG. 7A is a schematic diagram of an application scenario 4 of a control signaling transmission method according to the present invention.

Referring to FIG. 7A, FIG. 7A is a schematic diagram of another application scenario of a control signaling transmission method according to an embodiment of the present invention. The scenario is based on an SDN network. A difference between FIG. 7A and FIG. 6A mainly lies in that in the scenario of FIG. 7A, a target network element communicating with an MME is a GW-C, instead of an eNB; and that the scenario in FIG. 7A further includes a MANO controlling and managing the GW-C. The MANO may include a component such as Nova or Neutron of OpenStack and an NMS. A controller in FIG. 7A is jointly implemented by using the MANO and an OF controller.

Figure 7B:
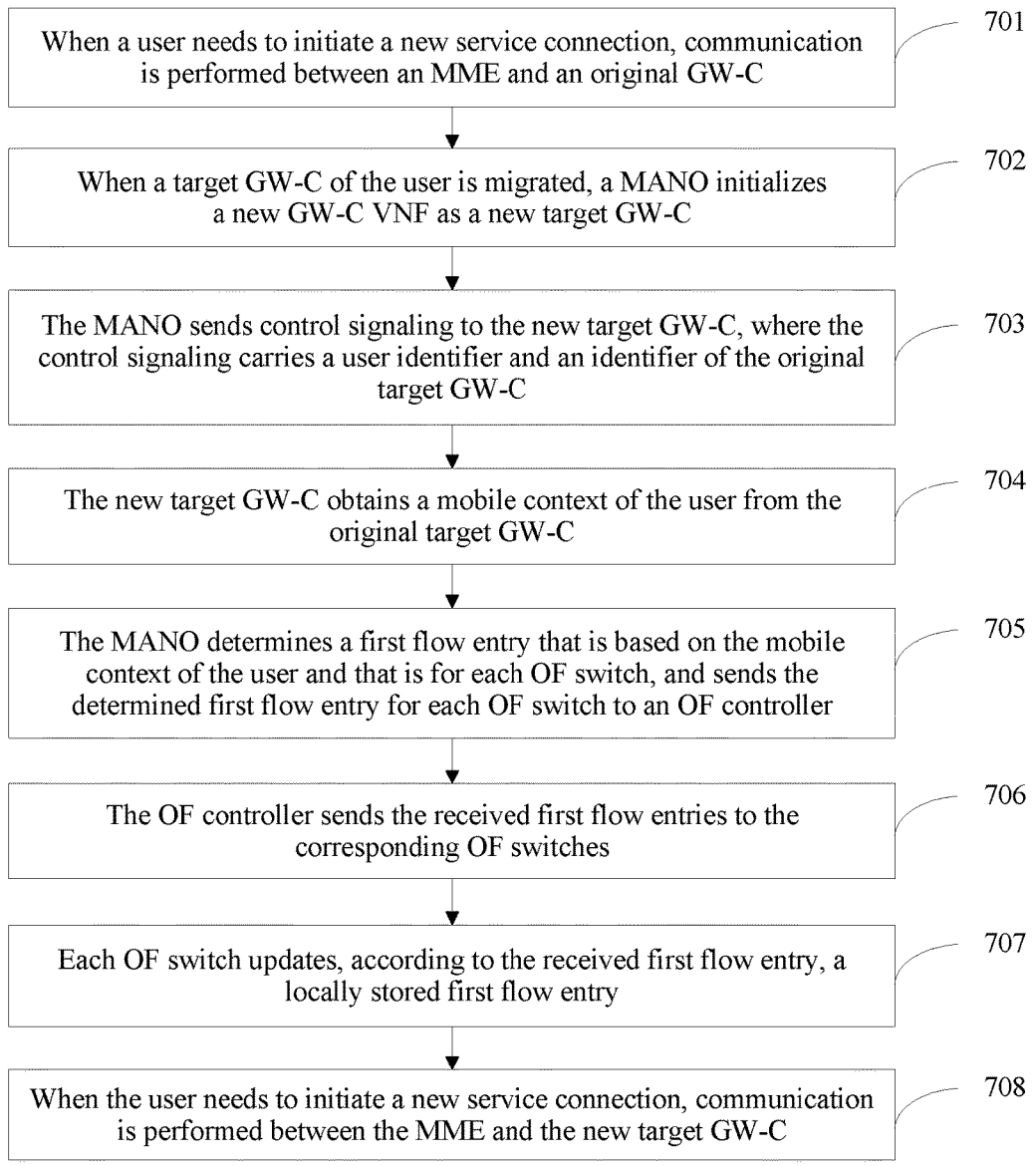
FIG. 7B is a schematic diagram of a sixth embodiment of a control signaling transmission method according to the present invention.

In FIG. 7B, with reference to FIG. 7A, implementation of the control signaling transmission method in this embodiment of the present invention is described. In this method, it is assumed that user equipment has accessed a network, and a network element in which a context of the user equipment is located is an original target GW-C. The method includes the following steps.

Step 701: When user equipment needs to initiate a new service connection, communication is performed between an MME and an original GW-C by using steps 607 to 611, and a difference lies only in that the eNB in steps 607 to 611 is replaced with the original target GW-C.

Step 702: When a target GW-C of the user equipment is migrated, a MANO initializes a new GW-C VNF as a new target GW-C.

This step may be implemented by enabling a pre-configured GW-C virtual machine by the OpenStack by using a Nova group, or may be implemented by enabling a GW-C virtual process in an existing virtual machine.

Step 703: The MANO sends control signaling to the new target GW-C, where the control signaling carries an identifier of the user equipment and an identifier of the original target GW-C.

The control signaling may be PDP context relocation (PDP context relocation) signaling.

The control signaling is used to instruct the new target GW-C to serve the user equipment indicated by the identifier of the user equipment.

The identifier of the user equipment may be an IMSIa.

In this step, the control signaling may be sent by an NMS.

Step 704: The new target GW-C obtains the mobile context of the user equipment from the original target GW-C.

The mobile context of the user equipment may be transferred between GW-Cs by reusing a forward relocation request/response (Forward Relocation Request/Response) message, or by using user-defined context transfer signaling, or by using a memory sharing mechanism between virtual machines.

Step 705: The MANO determines, for each OF switch according to a route between each OF switch and the new target GW-C, a first flow entry that is based on the mobile context of the user equipment, and sends the determined first flow entry for each OF switch to an OF controller.

The MANO may send information about the first flow entry to the OF controller by using a flow entry update message. The flow entry update message may be sent to the OF controller by using a Neutron component of the OpenStack.

Step 706: The OF controller sends the received first flow entries to the corresponding OF switches.

Step 707: Each OF switch updates, according to the received first flow entry, a locally saved first flow entry.

Step 708: When the user equipment needs to initiate a new service connection, communication is performed between the MME and the new target GW-C by using steps 607 to 611, and a difference lies only in that the eNB in steps 607 to 611 is replaced with the new target GW-C.

In this embodiment, control signaling is transmitted between an MME and a GW-C and based on addressing of a mobile context of user equipment; and when a target GW-C of the user equipment is migrated, a MANO determines, for each OF switch according to a route between each OF switch and a new target GW-C, a first flow entry that is based on the mobile context of the user equipment, and uses the determined first flow entry to update a first flow entry saved in each OF switch. It is ensured that the control signaling can be subsequently exchanged between the MME and the new target GW-C based on the addressing of the mobile context of the user equipment. This process is completed within a data center, without the need of signaling exchange across data centers, so that transmission resources of a cloud network are reduced, more flexible and high-efficient resource scheduling within the cloud network is implemented, and mobile controllability and running efficiency of the cloud network are improved. In addition, an internal topology structure of the data center is shielded from the outside. The present invention is applicable to an environment in which virtualized control network elements are frequently dynamically migrated, and plug-and-play of a mobile network element function is implemented.

Corresponding to the foregoing method, the embodiments of the present invention further provide a forwarder and a controller.

Figure 8:
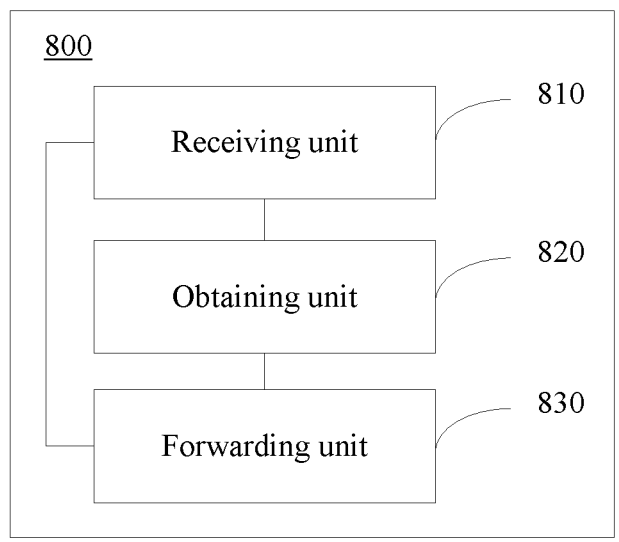
FIG. 8 is a schematic diagram of an embodiment of a forwarder according to the present invention.

Referring to FIG. 8, FIG. 8 is a forwarder according to an embodiment of the present invention. The forwarder 800 includes:

a receiving unit 810, configured to receive control signaling carrying rule matching information, where the rule matching information includes classification information and an identifier of a mobile context of user equipment;

an obtaining unit 820, configured to obtain, according to the rule matching information received by the receiving unit 810, a processing rule corresponding to the rule matching information, where the processing rule includes rule description information and forwarding routing information, the processing rule corresponding to the rule matching information is a processing rule whose rule description information matches the rule matching information, and the match between the rule description information and the rule matching information includes: a match between classification information in the rule description information and the classification information in the rule matching information, and a match between an identifier of a mobile context of user equipment in the rule description information and the identifier of the mobile context of the user equipment in the rule matching information; and a forwarding unit 830, configured to forward, according to the forwarding routing information of the processing rule obtained by the obtaining unit 820, the control signaling received by the receiving unit 810 to a next-hop network element for the control signaling.

Optionally, the receiving unit 810 may be further configured to: receive a processing rule that is sent by a controller and that is related to the mobile context of the user equipment, where the processing rule related to the mobile context of the user equipment is determined by the controller according to a route between the forwarder and a service network element, or a route between the forwarder and a target network element, the service network element is a network element serving the user equipment, and the target network element is a network element to which the mobile context of the user equipment belongs.

The forwarder further includes:

a storage unit, configured to save the processing rule received by the receiving unit 810.

Optionally, the receiving unit 810 may be further configured to: when the mobile context of the user equipment is migrated from an original target network element to a new target network element, receive the processing rule that is sent by the controller and that is related to the mobile context of the user equipment.

The storage unit may be further configured to update, according to the processing rule received by the receiving unit, the processing rule that is saved by the storage unit and that is related to the mobile context of the user equipment; where the processing rule received by the receiving unit is determined by the controller according to a route between the forwarder and the new target network element, and the new target network element is a network element to which the mobile context of the user equipment belongs after the mobile context of the user equipment is migrated.

Optionally, the obtaining unit 820 may be configured to find, from processing rules saved by the storage unit and according to the rule matching information, the processing rule corresponding to the rule matching information.

Optionally, the obtaining unit 820 may be configured to: search, according to the rule matching information, rule description information in the processing rules saved by the storage unit; find rule description information matching the rule matching information; and use a processing rule including the found rule description information as the processing rule corresponding to the rule matching information.

Optionally, the obtaining unit 820 may be configured to: send a processing rule query request to a controller, where the request carries the rule matching information; and receive the processing rule that is sent by the controller and that corresponds to the rule matching information.

Optionally, the forwarding routing information of the processing rule includes a forwarding port. The forwarding unit 830 may be configured to forward, by using the forwarding port, the control signaling received by the receiving unit 810, so as to forward the control signaling to the next-hop network element.

Optionally, the identifier of the mobile context of the user equipment may include: an IMSI or a P-TMSI of the user equipment. The classification information may include a network element type of a destination network element for the control signaling, or a signaling type of the control signaling. The network element type of the destination network element for the control signaling may include: an MME or an eNB; or the network element type of the destination network element for the control signaling may include a target network element or a service network element; or the signaling type of the control signaling may include a service request or a service response.

Figure 9:
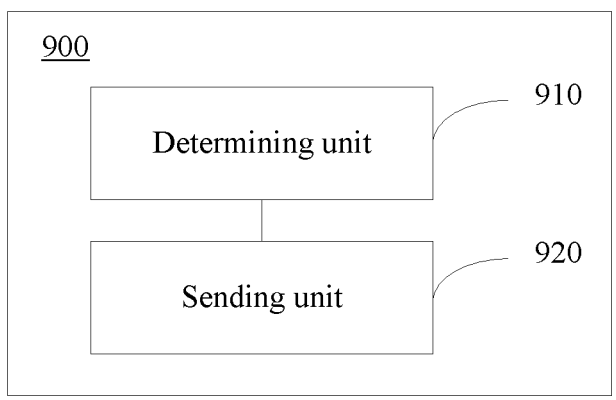
FIG. 9 is a schematic diagram of an embodiment of a controller according to the present invention.

Referring to FIG. 9, FIG. 9 is a controller according to an embodiment of the present invention. The controller 900 may include:

a determining unit 910, configured to: determine a route between a forwarder and a service network element and a route between the forwarder and a target network element, where the service network element is a network element accessed by user equipment, and the target network element is a network element to which a mobile context of the user equipment belongs; and determine, according to the route between the forwarder and the service network element and the route between the forwarder and the target network element, a processing rule that corresponds to the forwarder and that is related to the mobile context of the user equipment, where the processing rule is used when the forwarder forwards, according to the processing rule, control signaling carrying rule matching information to a next-hop network element, the processing rule includes rule description information and forwarding routing information, the rule description information matches the rule matching information, the rule matching information includes classification information and an identifier of the mobile context of the user equipment, and the match between the rule description information and the rule matching information includes: a match between classification information in the rule description information and the classification information in the rule matching information, and a match between an identifier of a mobile context of user equipment in the rule description information and the identifier of the mobile context of the user equipment in the rule matching information; and a sending unit 920, configured to send, to the forwarder, the processing rule that is determined by the determining unit 910, that corresponds to the forwarder, and that is related to the mobile context of the user equipment.

Optionally, the controller 900 may further include:

a first receiving unit, configured to receive a processing rule query request sent by the forwarder, where the request carries the rule matching information; and an obtaining unit, configured to obtain a processing rule corresponding to the rule matching information received by the first receiving unit; where the sending unit 920 may be further configured to send the processing rule that is obtained by the obtaining unit and that corresponds to the rule matching information to the forwarder.

Optionally, the obtaining unit may be configured to: search, according to the rule matching information carried in the request received by the first receiving unit, rule description information in processing rules saved by the controller; find rule description information matching the rule matching information; and use a processing rule including the found rule description information as the processing rule corresponding to the rule matching information.

Optionally, the controller 900 may further include:

a second receiving unit, configured to receive a first path switch request message sent by the target network element, where the first path switch request message includes an identifier of the user equipment and an identifier of the target network element, and the first path switch request message is used to request the controller to determine the processing rule that corresponds to the forwarder and that is related to the mobile context of the user equipment.

Optionally, the second receiving unit may be further configured to: when the mobile context of the user equipment is migrated from an original target network element to a new target network element, receive a second path switch request message sent by the new target network element, where the second path switch request message includes the identifier of the user equipment and an identifier of the new target network element, and the second path switch request message is used to request the controller to determine the processing rule that corresponds to the forwarder and that is related to the mobile context of the user equipment.

The determining unit may be further configured to: determine a route between the forwarder and the new target network element indicated by the identifier that is of the new target network element and that is received by the second receiving unit; and determine, according to the determined route between the forwarder and the new target network element, a processing rule that corresponds to each forwarder and that is related to the mobile context of the user equipment.

Optionally, the determining unit 910 may be further configured to determine the target network element.

The sending unit 920 may be further configured to send first service control signaling to the target network element determined by the determining unit 910, where the first service control signaling carries an identifier of the user equipment, and the first service control signaling is used to instruct the target network element to create the mobile context for the user equipment.

Optionally, the determining unit 910 may be further configured to: when the mobile context of the user equipment is migrated from an original target network element to a new target network element, determine the new target network element.

The sending unit 920 may be further configured to send second service control signaling to the new target network element, where the second service control signaling carries the identifier of the user equipment and an identifier of the original target network element, and the second service control signaling is used to instruct the new target network element to obtain the mobile context of the user equipment from the original target network element.

Optionally, the identifier of the mobile context of the user equipment may include: an IMSI or a P-TMSI of the user equipment. The classification information may include a network element type of a destination network element for the control signaling, or a signaling type of the control signaling. The network element type of the destination network element for the control signaling may include: an MME or an eNB; or the network element type of the destination network element for the control signaling may include a target network element or a service network element; or the signaling type of the control signaling may include a service request or a service response.

Figure 10:
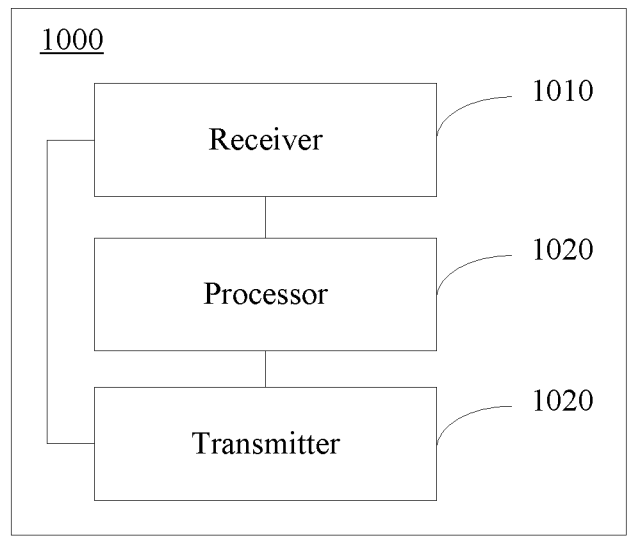
FIG. 10 is a schematic diagram of another embodiment of a forwarder according to the present invention.

Referring to FIG. 10, FIG. 10 is a schematic structural diagram of a forwarder according to an embodiment of the present invention. The forwarder 1000 includes:

a receiver 1010, configured to receive control signaling carrying rule matching information, where the rule matching information includes classification information and an identifier of a mobile context of user equipment;

a processor 1020, configured to obtain, according to the rule matching information received by the receiver 1010, a processing rule corresponding to the rule matching information, where the processing rule includes rule description information and forwarding routing information, the processing rule corresponding to the rule matching information is a processing rule whose rule description information matches the rule matching information, and the match between the rule description information and the rule matching information includes: a match between classification information in the rule description information and the classification information in the rule matching information, and a match between an identifier of a mobile context of user equipment in the rule description information and the identifier of the mobile context of the user equipment in the rule matching information; and a transmitter 1030, configured to forward, according to the forwarding routing information of the processing rule obtained by the processor 1020, the control signaling received by the receiver 1010 to a next-hop network element.

Figure 11:
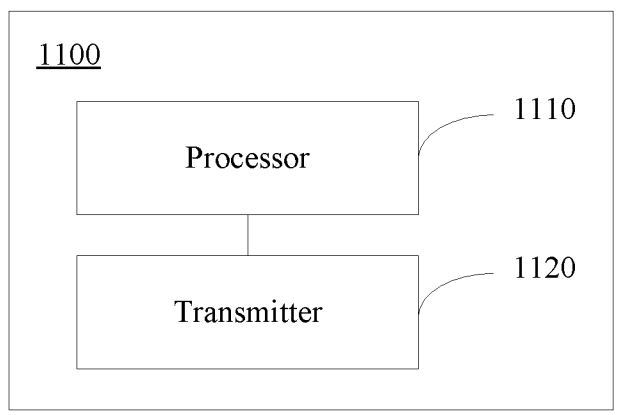
FIG. 11 is a schematic diagram of another embodiment of a controller according to the present invention.

Referring to FIG. 11, FIG. 11 is a schematic structural diagram of a controller according to an embodiment of the present invention. The controller 1100 includes:

a processor 1110, configured to: determine a route between a forwarder and a service network element and a route between the forwarder and a target network element, where the service network element is a network element accessed by user equipment, and the target network element is a network element to which a mobile context of the user equipment belongs; and determine, according to the route between the forwarder and the service network element and the route between the forwarder and the target network element, a processing rule that corresponds to the forwarder and that is related to the mobile context of the user equipment, where the processing rule is used when the forwarder forwards, according to the processing rule, control signaling carrying rule matching information to a next-hop network element, the processing rule includes rule description information and forwarding routing information, the rule description information matches the rule matching information, the rule matching information includes classification information and an identifier of the mobile context of the user equipment, and the match between the rule description information and the rule matching information includes: a match between classification information in the rule description information and the classification information in the rule matching information, and a match between an identifier of a mobile context of user equipment in the rule description information and the identifier of the mobile context of the user equipment in the rule matching information; and a transmitter 1120, configured to send, to the forwarder, the processing rule that is determined by the processor 1110, that corresponds to the forwarder, and that is related to the mobile context of the user equipment.

In this embodiment, in an addressing process of a mobile context of user equipment, control signaling exchanged between a service network element and a target network element is not transmitted in an IP address manner, and a forwarder obtains, according to rule matching information in the control signaling, a processing rule corresponding to the rule matching information, and forwards the control signaling to a next-hop network element for the control signaling according to forwarding routing information of the obtained processing rule, so that the control signaling is exchanged between the service network element and the target network element by means of hop-by-hop forwarding by the forwarder. In addition, when the target network element is migrated, only a processing rule in a data center needs to be updated, without the need of signaling exchange across data centers, so that transmission resources of a cloud network are reduced.

A person skilled in the art may clearly understand that, the technologies in the embodiments of the present invention may be implemented by software in addition to a necessary general hardware platform. Based on such an understanding, the technical solutions of the present invention essentially or the part contributing to the prior art may be implemented in a form of a software product. The software product is saved in a storage medium, such as a ROM/RAM, a hard disk, or an optical disc, and includes several instructions for instructing a computer device (which may be a personal computer, a server, or a network device) to perform the methods described in the embodiments or some parts of the embodiments of the present invention.

The embodiments in this specification are all described in a progressive manner, for same or similar parts in the embodiments, reference may be made to these embodiments, and each embodiment focuses on a difference from other embodiments. Especially, a system embodiment is basically similar to a method embodiment, and therefore is described briefly; for related parts, reference may be made to partial descriptions in the method embodiment.

The foregoing descriptions are implementation manners of the present invention, but are not intended to limit the protection scope of the present invention. Any modification, equivalent replacement, and improvement made without departing from the spirit and principle of the present invention shall fall within the protection scope of the present invention.

What is claimed is:

1. A method of control signaling transmission, comprising:
   receiving and saving, by a forwarder from a controller, a processing rule related to a mobile context of a user equipment, wherein the processing rule related to the mobile context of the user equipment is determined by the controller according to a route between the forwarder and a service network element, or a route between the forwarder and a target network element, the service network element is a network element serving the user equipment, and the target network element is a network element to which the mobile context of the user equipment belongs;
   receiving, by the forwarder, control signaling carrying rule matching information, wherein the rule matching information comprises classification information and an identifier of the mobile context of the user equipment;
   obtaining, by the forwarder according to the rule matching information, a processing rule corresponding to the rule matching information, wherein the processing rule comprises rule description information and forwarding routing information, the processing rule corresponding to the rule matching information is a processing rule whose rule description information matches the rule matching information, and the match between the rule description information and the rule matching information comprises: a match between classification information in the rule description information and the classification information in the rule matching information, and a match between an identifier of a mobile context of user equipment in the rule description information and the identifier of the mobile context of the user equipment in the rule matching information; and
   forwarding, by the forwarder, the control signaling to a next-hop network element according to the forwarding routing information of the obtained processing rule.

2. The method according to claim 1, further comprising:
   when the mobile context of the user equipment is migrated from an original target network element to a new target network element, receiving, by the forwarder, the processing rule from the controller and that is related to the mobile context of the user equipment; and updating, according to the received processing rule, a processing rule that is locally saved by the forwarder and that is related to the mobile context of the user equipment; wherein the processing rule received by the forwarder is determined by the controller according to a route between the forwarder and the new target network element, and the new target network element is a network element to which the mobile context of the user equipment belongs after the mobile context of the user equipment is migrated.

3. The method according to claim 1, wherein the obtaining, by the forwarder according to the rule matching information, a processing rule corresponding to the rule matching information comprises:
   finding, by the forwarder from processing rules saved by the forwarder and according to the rule matching information, the processing rule corresponding to the rule matching information.

4. The method according to claim 3, wherein the finding, by the forwarder from processing rules saved by the forwarder and according to the rule matching information, the processing rule corresponding to the rule matching information comprises:
   searching, by the forwarder according to the rule matching information, rule description information in the processing rules saved by the forwarder; finding rule description information matching the rule matching information; and using a processing rule comprising the found rule description information as the processing rule corresponding to the rule matching information.

5. The method according to claim 1, wherein the obtaining, by the forwarder according to the rule matching information, a processing rule corresponding to the rule matching information comprises:
   sending, by the forwarder, a processing rule query request to a controller, wherein the request carries the rule matching information, and the processing rule query request is used to request the processing rule corresponding to the rule matching information; and
   receiving, by the forwarder, the processing rule that is sent by the controller and that corresponds to the rule matching information.

6. The method according to claim 1, wherein the forwarding routing information of the processing rule comprises a forwarding port; and
   the forwarding, by the forwarder, the control signaling to a next-hop network element according to the forwarding routing information of the obtained processing rule comprises:
   forwarding, by the forwarder, the control signaling to the next-hop network element by using the forwarding port.

7. The method according to claim 1, wherein the identifier of the mobile context of the user equipment comprises: an international mobile subscriber identity (IMSI) or a packet temporary mobile subscriber identity (P-TMSI) of the user equipment.

8. The method according to claim 1, wherein the classification information comprises a network element type of a destination network element for the control signaling, or a signaling type of the control signaling.

9. A non-transitory computer-readable storage medium comprising instructions which, when executed by a computer, cause the computer to carry out a method of control signaling transmission, comprising:
   receiving and saving, by a forwarder from a controller, a processing rule related to a mobile context of a user equipment, wherein the processing rule related to the mobile context of the user equipment is determined by the controller according to a route between the forwarder and a service network element, or a route between the forwarder and a target network element, the service network element is a network element serving the user equipment, and the target network element is a network element to which the mobile context of the user equipment belongs;

receiving, by the forwarder, control signaling carrying rule matching information, wherein the rule matching information comprises classification information and an identifier of the mobile context of the user equipment;

obtaining, by the forwarder according to the rule matching information, a processing rule corresponding to the rule matching information, wherein the processing rule comprises rule description information and forwarding routing information, the processing rule corresponding to the rule matching information is a processing rule whose rule description information matches the rule matching information, and the match between the rule description information and the rule matching information comprises: a match between classification information in the rule description information and the classification information in the rule matching information, and a match between an identifier of a mobile context of user equipment in the rule description information and the identifier of the mobile context of the user equipment in the rule matching information; and forwarding, by the forwarder, the control signaling to a next-hop network element according to the forwarding routing information of the obtained processing rule.

10. A forwarder, comprising:

a receiver, configured to:

receive from a controller a processing rule related to a mobile context of user equipment, wherein the processing rule related to the mobile context of the user equipment is determined by the controller according to a route between the forwarder and a service network element, or a route between the forwarder and a target network element, the service network element is a network element serving the user equipment, and the target network element is a network element to which the mobile context of the user equipment belongs; and receive control signaling carrying rule matching information, wherein the rule matching information comprises classification information and an identifier of the mobile context of the user equipment;

a memory, configured to save the processing rule received by the receiver;

a processor, configured to obtain, according to the rule matching information received by the receiver, a processing rule corresponding to the rule matching information, wherein the processing rule comprises rule description information and forwarding routing information, the processing rule corresponding to the rule matching information is a processing rule whose rule description information matches the rule matching information, and the match between the rule description information and the rule matching information comprises: a match between classification information in the rule description information and the classification information in the rule matching information, and a match between an identifier of a mobile context of user equipment in the rule description information and the identifier of the mobile context of the user equipment in the rule matching information; and a transmitter, configured to forward, according to the forwarding routing information of the processing rule obtained by the processor, the control signaling received by the receiver to a next-hop network element for the control signaling.

11. The forwarder according to claim 10, wherein the receiver is configured to: when the mobile context of the user equipment is migrated from an original target network element to a new target network element, receive the processing rule that is sent by the controller and that is related to the mobile context of the user equipment; and the memory is configured to update, according to the processing rule, the processing rule that is saved by the memory and that is related to the mobile context of the user equipment; wherein the processing rule received by the receiver is determined by the controller according to a route between the forwarder and the new target network element, and the new target network element is a network element to which the mobile context of the user equipment belongs after the mobile context of the user equipment is migrated.

12. The forwarder according to claim 10, wherein the processor is configured to find, from processing rules saved by the memory and according to the rule matching information, the processing rule corresponding to the rule matching information.

13. The forwarder according to claim 12, wherein the processor is configured to: search, according to the rule matching information, rule description information in the processing rules saved by the memory; find rule description information matching the rule matching information; and use a processing rule comprising the found rule description information as the processing rule corresponding to the rule matching information.

14. The forwarder according to claim 10, wherein the processor is configured to: send a processing rule query request to a controller, wherein the request carries the rule matching information; and receive the processing rule that is sent by the controller and that corresponds to the rule matching information.

15. The forwarder according to claim 10, wherein the forwarding routing information of the processing rule comprises a forwarding port; and the transmitter is configured to forward, by using the forwarding port, the control signaling received by the receiver, so as to forward the control signaling to the next-hop network element.

16. The forwarder according to claim 10, wherein the identifier of the mobile context of the user equipment comprises: an international mobile subscriber identity (IMSI) or a packet temporary mobile subscriber identity (P-TMSI) of the user equipment.

17. The forwarder according to claim 10, wherein the classification information comprises a network element type of a destination network element for the control signaling, or a signaling type of the control signaling.

18. The forwarder according to claim 17, wherein the network element type of the destination network element for the control signaling comprises: a mobility management entity (MME) or an evolved NodeB (eNB); or the network element type of the destination network element for the control signaling comprises: a target network element or a service network element; or the signaling type of the control signaling comprises: a service request or a service response.

* * * * *